United States Patent [19]

Ishikawa et al.

[11] Patent Number: 5,677,747
[45] Date of Patent: Oct. 14, 1997

[54] LIQUID CRYSTAL DISPLAY DEVICE WITH COMPENSATION FOR VIEWING ANGLE DEPENDENCY AND OPTICAL ANISOTROPIC ELEMENT USED THEREIN

[75] Inventors: Masahito Ishikawa; Atsuyuki Manabe; Nobuko Fukuoka; Hitoshi Hatoh, all of Kanagawa-ken, Japan

[73] Assignee: Kabushiki Kaisha Toshiba, Kawasaki, Japan

[21] Appl. No.: 686,013

[22] Filed: Jul. 25, 1996

[30] Foreign Application Priority Data

Jul. 25, 1995 [JP] Japan .................... 7-189183

[51] Int. Cl.⁶ .................... G02F 1/1335; G02F 1/1347
[52] U.S. Cl. .................... 349/76; 349/118; 349/120
[58] Field of Search .................... 349/76, 75, 117, 349/118, 119, 120, 193; 359/494; 428/1

[56] References Cited

U.S. PATENT DOCUMENTS

| | | | |
|---|---|---|---|
| 5,119,216 | 6/1992 | Wada et al. | 349/76 |
| 5,241,408 | 8/1993 | Ishikawa et al. | 349/76 |
| 5,308,535 | 5/1994 | Scheuble et al. | 349/76 |
| 5,375,006 | 12/1994 | Haag | 349/120 |
| 5,506,706 | 4/1996 | Yamahara et al. | 349/118 |
| 5,518,783 | 5/1996 | Kawata et al. | 428/1 |
| 5,526,150 | 6/1996 | Mazaki et al. | 349/73 |
| 5,583,679 | 12/1996 | Ito et al. | 349/118 |

*Primary Examiner*—William L. Sikes
*Assistant Examiner*—Tai V. Duong
*Attorney, Agent, or Firm*—Cushman, Darby & Cushman IP Group of Pillsbury Madison & Sutro LLP

[57] ABSTRACT

In a liquid crystal display device having a driving liquid crystal cell interposed between two polarizers 1 and 4, the cell having a liquid crystal layer 3e held between two substrates 3a and 3b, the layer having a twisted molecular alignment when no voltage is applied, and the liquid crystal cell performing optical control, using the optical anisotropy of liquid crystal, there is provided with an optical anisotropic element 2 between the polarizer and the driving liquid crystal cell, the optical anisotropic element 2 comprising an optical anisotropic substance layer 2c in which the optical rotatory power slanted to the normal of the substrates 3a and 3b is greater than the optical rotatory power in the direction of the normal of the substrate. The angle of the optical axis of the optical anisotropic element 2 varies continuously or in stages in the direction of layer thickness of the optical anisotropic element as against the surface of the optical anisotropic element.

18 Claims, 22 Drawing Sheets

LIQUID CRYSTAL DISPLAY DEVICE WITH COMPENSATION FOR VIEWING ANGLE DEPENDENCY AND OPTICAL ANISOTROPIC ELEMENT USED THEREIN

BACKGROUND OF THE INVENTION

1. Field of the Invention

This invention relates to a liquid crystal display device and the optical anisotropic element used therein.

2. Description of the Related Art

The liquid crystal display device is not only used as display unit for wrist watch, electronic calculator, word processor and personal computer thanks to its crucial advantages of being thin and light-weighted and of low power consumption, but also widely used in many newly designed landmark products.

The liquid crystal display device used in personal computer, among others, is employed in larger and larger size of display units with higher capacity and greater size of display surface 10 inches diagonally and 640×480 pixels or more. The display system used in this class of liquid crystal display device may roughly be divided into two: one is simple-matrix system and another, active matrix system.

The simple-matrix system features a simple structure in which the liquid crystal is held between two sheets of glass substrates provided with stripe-shaped transparent electrodes. The simple matrix system demands the liquid crystal a high performance all the more.

Before describing this performance, we briefly explain the display principle of the liquid crystal display device. The liquid crystal display device achieves the display changing the orientation of the liquid crystal molecules by varying the voltage applied on the liquid crystal.

Generally a large contrast requires a large differential voltage. The display with as many as 640×480 pixels has however only about 1V of voltage difference between dark state and bright state. Only 1V of difference requires a large state alteration of molecular liquid crystal. Many of the researches have thus far been conducted to realize such a feat. In 1985, the research group of Shafer et al. found out the fact that the change in the alignment of the liquid crystal molecules sensitively responds to the change in voltage if the twist angle of the liquid crystal display device is enlarged and that the liquid crystal molecules have a certain tilt to get a stable arrangement with a large twist angle. Since this research report, the alignment technology to realize this has been briskly developed and invested into its commercialization successfully.

In general, 180° or more twist angle is necessary to materialize a display with as many as 640×480 pixels. The liquid crystal display device with such a large twist angle has been called "Super Twist Nematic" (STN). Note however that the STN display at early stage was not achromatic, but colored; for example, with green characters in yellow background. This is due to too large a twist angle. Japanese Patent Publication 63-53528 (1985) discloses a technique to solve such problems as colored display. This method technique realizes an achromatic display by arranging a second liquid crystal cell with its array of liquid crystal layer twisted in opposite direction between a polarizer and a first liquid crystal cell.

The principle of this achromatization consists in resolving the optically rotatory dispersion, that is, a wavelength dependence of optical rotatory power, by transmitting, the light produced this dispersion after passing through the first liquid crystal cell caused to have a large twisted molecular structure in the cell, through the second liquid crystal cell having a symmetrical structure to that of the first liquid crystal cell. As a result, the color caused by the optically rotatory dispersion was dissolved to materialize the achromatic display. In order to perform such a conversion exactly, it is necessary that the second liquid crystal cell, which is an optical compensation plate, has a retardation value substantially the same with that of the first liquid crystal cell with their twist directions being opposed to each other and their arrays are so configured that the directors of the liquid crystal display device cell molecules coming most close to each other should intersect each other.

A variety of other techniques have so far been proposed. For example, optically anisotropic film may be used in place of the second liquid crystal cell. Lamination of the optically anisotropic film on the liquid crystal cell affords a performance substantially equivalent to that of the second liquid crystal cell.

The optical compensation as above makes it possible to display achromatically even on the STN display unit. Furthermore, this achromatic display combined with color filter enables to have a high value added colored display. Since however the simple multiplex system is based on the principle of multiplex drive, which in its turn is based on the average voltage method, if the number of scanning lines is increased to augment the display capacity, the difference reduces remarkably between the voltage when the light is intercepted and that when the light is left to transmit, which may result in lower contrast or slower response of the liquid crystal. This is a critical weak point. Such conventional techniques are much problematical if one tries to realize a liquid crystal display device with higher display quality, because they may cause such negative phenomena as display screen seen reversed (that is, obverse and reverse) depending on the orientation and angle when viewing it, disappearance of the display image or display catching colors.

On the other hand, the active matrix system, which is provided with switching element comprising, for each display pixel, thin-film transistor or diode, allows us to set a given voltage ratio on the liquid crystal layer of each pixel irrespectively of the number of scanning lines. No special performance such as that for the simple matrix system is required in the active matrix system. There is therefore no need to increase the twist angle as in the case of STN. It has been considered that angle of 90° suffice for the active matrix system.

In the liquid crystal cell (TN) with a small 90° twist angle, the optical rotatory dispersion is small since the light rotates following faithfully the twist, which ensures a colorless, high contrast display. The response to voltage is more rapid than in the STN too. A favorable combination of the active matrix system with the TN will realize a liquid crystal display device featuring a large display capacity, higher contrast and higher response speed. Since further there is a switching element for each pixel, an intermediate voltage can be applied, which enables to make a gray scale (half tone) image. Moreover, the TN as combined with color filter will facilitate the materialization of full colored display.

Even in the active matrix system, however, such phenomena are observed as obverse-reverse display screen depending on the orientation of view, total disappearance of display image and colored display when a gray scale image (half tone) is displayed, though not so with binary display. These phenomena are much problematical when one wants to realize a high quality liquid crystal display device.

Japanese Patent Laid-Open 62-21423 (1987) discloses a liquid crystal cell and a birefringence layer, which is a polymer film whose optical anisotropy is negative in the direction of its thickness, are between two polarizers, as means to reduce the visual angle dependency. On the other hand, Japanese Patent Laid-Open 3-67219 (1991) discloses an arrangement, on liquid crystal cell, of a birefringence layer composed of the liquid crystal compound (or high molecular liquid crystal) presenting cholesteric liquid crystal phase with 400 nm or less product of helical pitch length and refractive index. These two propositions have been contrived only for the cases of liquid crystal cells homeotropically aligned liquid crystal cells (molecular liquid crystal arranged perpendicularly to the aligned substrate), not for such liquid crystal cell with twisted orientation as TN and STN systems. Japanese Patent Laid-Open 4-349429 (1992) proposes to control the viewing angle of liquid crystal display device by optional compensation element with arrangement of 360° or more tilt angle, but the effect of enlarged viewing angle cannot yet be considered sufficient for gradation display (gray scale image).

The basic principle of the display by the liquid crystal display device thus far described consists in performing an optical control by changing the orientation of the liquid crystal molecules through the voltage to be applied to the liquid crystal.

Thus, the liquid crystal display device has such a visual angle dependency that this device, when viewed as tilted, changes the orientation of the molecular liquid crystal thus changing the way it is seen. When displaying a subtle gray scale image is displayed, in particular, the viewing angle dependency is more conspicuous since the inclination of the liquid crystal molecules is changed minutely.

Such visual angle dependency of the way the alignment of the liquid crystal molecules is seen gives rise to such phenomena as reversed image of display and total lack of recognition. When, in particular, colored display is made by combination with color filter, the reproducibility of the display reduces remarkably, which is one of the critical problems.

SUMMARY OF THE INVENTION

Accordingly, one of objects of the invention is to provide the liquid crystal display device with enhanced contrast and improved viewing angle dependency of the display colors, and the optical anisotropic element.

Briefly, in accordance with one aspect of the invention, there is provided a liquid crystal display device featuring the following characteristics:

In a liquid crystal display device having two polarizers and a driving liquid crystal cell having a liquid crystal layer held between the polarizers and twisted alignment when no voltage is applied, which performs an optical control utilizing the optical rotatory power of the liquid crystal, wherein optical anisotropic elements, with optical rotatory power comprising layers of optical anisotropic substance whose optical rotatory power as tiled to the normal of a substrate is greater than that in the direction of the normal of the substrate, are arranged between the polarizers and the driving liquid crystal cell.

In accordance with another aspect of the invention, there is provided a liquid crystal display device having two polarizers and the driving liquid crystal cell having the liquid crystal layer held between the polarizers and twisted alignment when no voltage is applied which performs an optical control utilizing the optical rotatory power of the liquid crystal, wherein the angle of the optical axis of optical anisotropic element varies continuously or in stages in the direction of layer thickness of the optical anisotropic element as against the substrate surface of the driving liquid crystal cell.

Furthermore, in accordance with another aspect of the invention, there is provided an optical anisotropic element comprising layers of optical anisotropic substance, in which the optical rotatory power in a direction tilted to the normal of the surface of optical anisotropic element is greater than that in the direction of the normal.

Angles of the optical axes of optical anisotropic element continuously or in stages changes in the layer thickness of the optical anisotropic element against the surface of the optical anisotropic element.

In the context of this specification, the optical anisotropic unit means the respective layers of an optical anisotropic element with certain thickness that has, for instance, a laminated structure consisting essentially of plural layers. Each layer is a unit having an optical axis oriented toward a particular direction and constitutes, when laminated, a configuration that changes its inclination gradually in continuous or staged fashion. Even the optical anisotropic element does not have any laminated construction, this invention defines here that the configuration in which the optical axes change in the direction of thickness means that the optical axes of optical anisotropic unit in optical anisotropic element change in series in the direction of the thickness.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Hereinafter, embodiments according to the invention will be described which are capable of achieving desirable viewing angle and bright display color when displaying gray scale is alleviated at the same time.

The polarized state of the visible light propagating in such a liquid crystal element as TN and STN depends upon whether the light comes in vertical or slanted to the display plane of the liquid crystal display device. This difference in polarized state is directly reflected on reversed display or colored display image. Such a phenomenon is supposed to go on slanting largely the viewing angle of the display plane of the liquid crystal element from the normal (frontal face) of the display plane. This tendency is elicited particularly in the pixels where voltage is applied on the liquid crystal layers of a liquid crystal cell having the means to apply voltage on the liquid crystal layers (hereafter referred to as "driving liquid crystal cell").

Figure 23A:
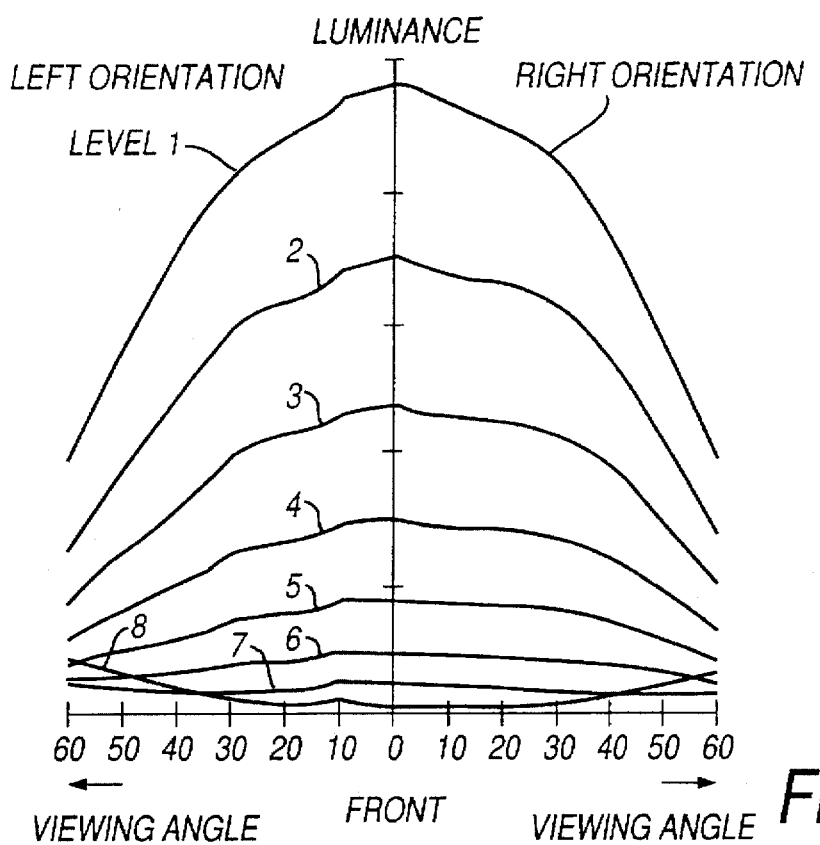
FIG. 23a and FIG. 23b are graphs showing the curves of viewing angle dependency of conventional TN-LCD luminance.
Figure 23B:
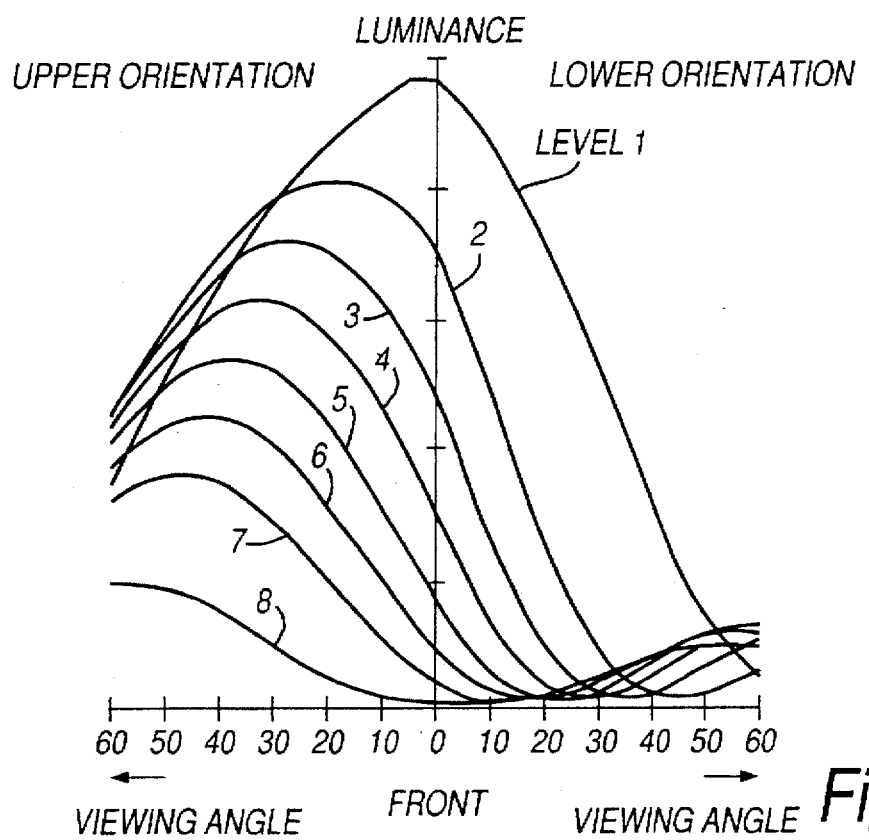

FIG. 23a and FIG. 23b show diagrammatically the angle dependency of display luminance when the horizontal and vertical inclination from the normal of display face (substrate face) of the conventional TN liquid crystal display device is from 0° to 60°. Levels 1 to 8 represent respective gradation numbers in the tonal display (assigning intensity levels), which manifests that the voltage applied to the liquid crystal cell differs sequentially. Applied to the liquid crystal cell is 0V for level 1, and 5V for level 8. In the case of upper orientation, for instance, the greater the angle (viewing angle) slanted from the normal of the display plane of the display unit (from 0° [front] to 60°), the greater the luminance becomes gradually. In the real display, the display color this luminance intensity is recognized as whitish (excessively bright image).

Referring to the upper orientation shown in FIG. 23b, the luminance reduces the more (contrary to the upper orientation), when the viewing angle is slanted gradually from front (0°) to 60°. In the actual display screen, this phenomenon is recognized as darkening (excessively dark) image. The brightest display level 1 and lower gradation level 2 on the front face reverse themselves in their largeness relationship at 35° of viewing angle in the upper orientation, which are observed as reverse image such as the negative of the photo film in the actual display image. It is idealistic that the transmittance of light does not change however the viewing angle may vary at any gradation level whatsoever. However, the viewing angle characteristic of actual TN is relatively good in the right and left orientation, but bad in vertical one.

The reason why such a phenomenon occurs is that the visual or viewing angle characteristic of the liquid crystal display device results from the polarized state which differs depending on the angle of incident light. We will argue this point later referring to an exemplary TN type device.

Figure 3A:
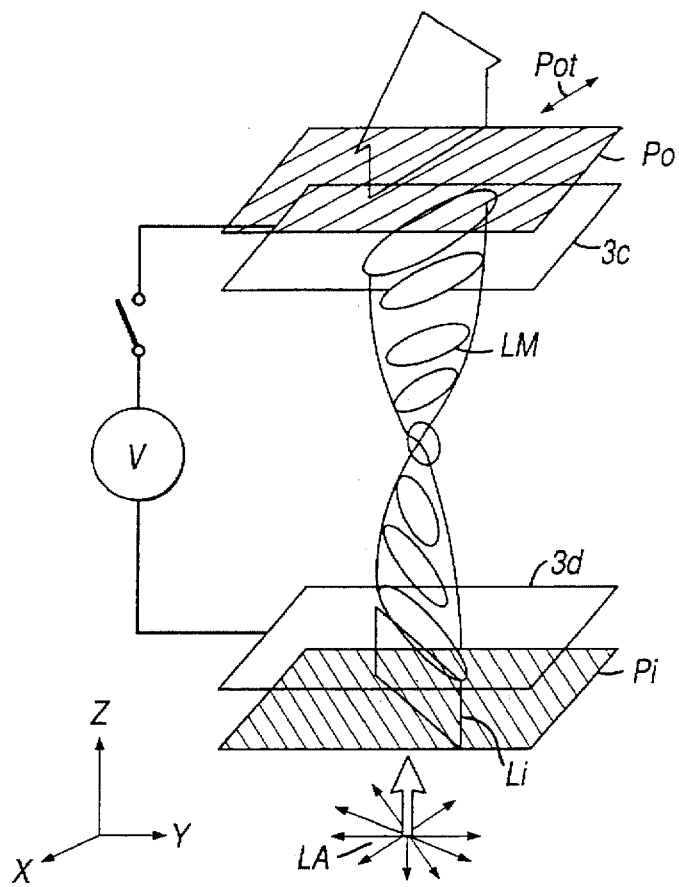
FIG. 3a and FIG. 3b are diagrams depicting the principle of operation of TN-LCD.
Figure 3B:
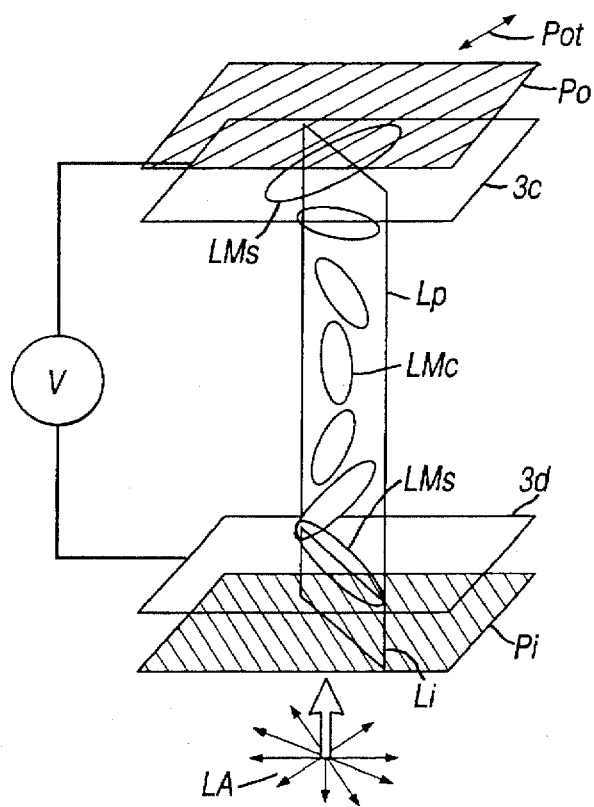

FIG. 3 illustrates the principle of the operation of TN-LCD (TN type liquid crystal device). FIG. 3 a represents the alignment of the liquid crystal molecules in the TN cell when no voltage is applied on the electrodes 3c and 3d. When voltage V is not applied, the liquid crystal molecules manifest a continuous twisted alignment of liquid crystal molecules, parallel to each other, in the direction of the thickness of the liquid crystal layers (direction of Z axis in the figure) nearly in parallel with the substrate. The liquid crystal molecules having an optical axis in the direction of their longer axis, the parallel alignment of liquid crystal molecules form an optical axial plane.

When the light beam Li as polarized by the polarizer Pi among the incident light beams LA impinges this alignment, the polarized plane rotates according to the twisted alignment of the liquid crystal molecules LM, and when the light quits the liquid crystal layer, it turns, by the twist angle of the liquid crystal, about the polarized plane before the light enters the liquid crystal layer. The transmitting light Lo is obtained when the transmission axis Pot of the analyzer Po is matched with this rotational direction.

FIG. 3a depicts the array of the liquid crystal cells in the TN cell when voltage is applied. Applying voltage V will raise the liquid crystal molecule LM, and the liquid crystal molecule LMc near the center of the cell is more tilted than the liquid crystal molecule LMs in the vicinity of the electrodes. The liquid crystal molecules LMs tilts little in the vicinity of the electrodes 3c and 3d because of the anchoring power at the electrode/liquid crystal layer interface, which is necessary to array the liquid crystal. As the voltage V grows higher, the liquid crystal molecules are tilted more, and at the same time the twist array distorts. Finally, the twisting is released when the voltage arrives at a certain level. If under these conditions the polarized light Li incides, the polarized plane Lp does not rotate, and the liquid crystal layers are made to progress due to the inexistence of the twisted array, namely because the optical axial plane is on a single axis. Where the light quits the liquid crystal layer, the polarized plane remains the same as before it entered the liquid crystal layer. Since the transmission axis Pot of the analyzer Po gets orthogonal with the polarized plane Lp, the polarized light cannot transmit. To display the half tone (gray scale image), the voltage to be applied on the liquid crystal layer is set lower and the twisted array is somewhat left and the polarized plane on which the light quits the liquid crystal layer is rotated to a certain extent to get an intermediate transmitting light.

This is the principle on which the TN device controls the system making use of the twisted array of the transmitting light. We now explain what phenomena occur to the slanted light.

Figure 4C:
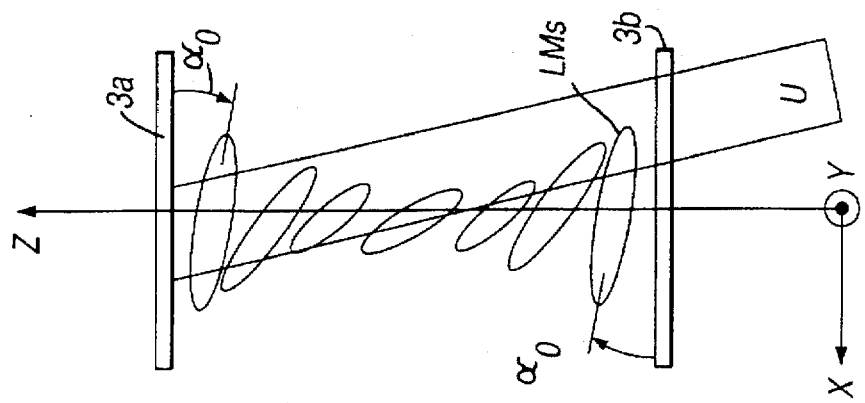
FIG. 4a, FIG. 4b and 4c are diagrams illustrating how the viewing angle characteristics of TN-LCD are generated.
Figure 4B:
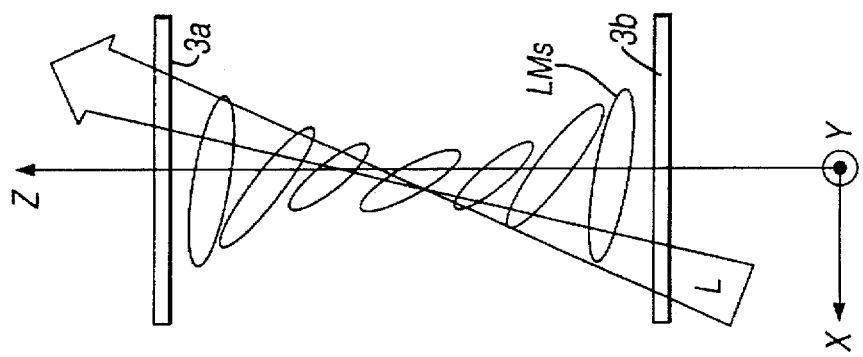
Figure 4A:
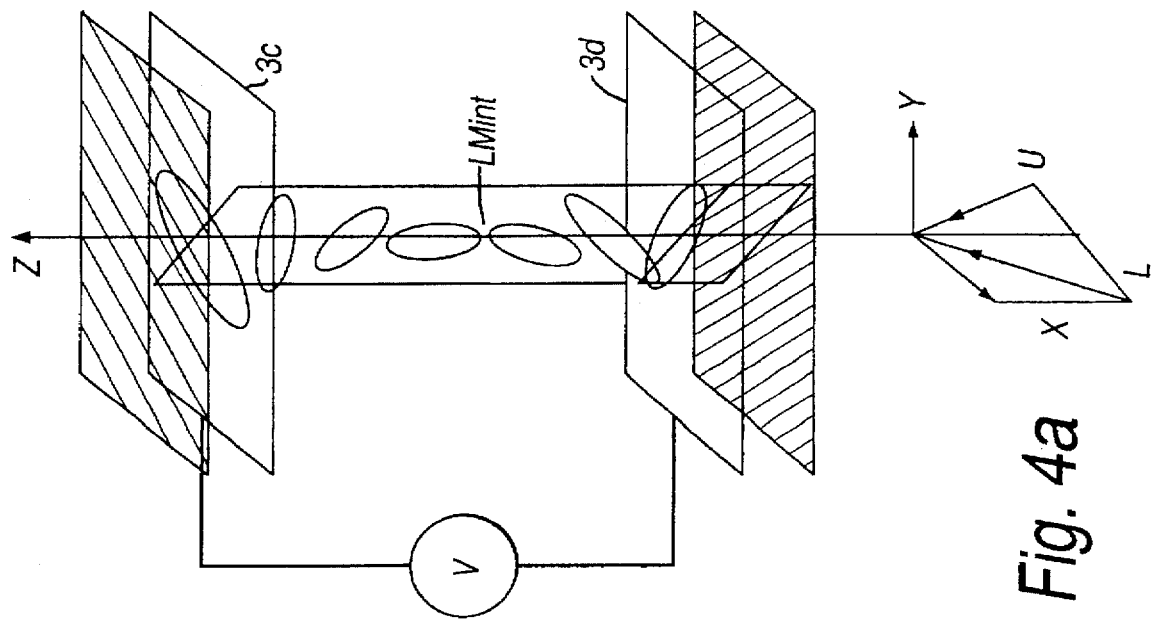

FIG. 4 illustrates how the light comes in slant on the molecular array when the half tone (gray scale image) is displayed. FIG. 4a is a perspective diagram showing the relationship of the molecular arrangement LMint when the half tone is displayed with the directions L and U of two incident light. For this diagram to be more comprehensible, FIG. 4b and FIG. 4c depicts the views from the direction of y axis, where z axis represents the direction of the norm of the substrate of the driving liquid crystal cell while the x and y axes indicate the substrate faces. This slant or tilt is called "pretilt." In general, the pretilt signifies the tilting of liquid crystal molecules at the substrate/liquid crystal interface, and the tilting angle is called "pretilt angle $\alpha_o$."

When no voltage is applied the liquid crystal molecules are held inclined at a same angle over the upper and lower substrates 3a and 3b. If there exists a certain slant (pretilt) over the range with voltage to be applied, the directions of the inclination are justified into the pretilt direction, which will cause discrimination lines on the boundary of the region with different tilting directions to degrade remarkably the display quality. Consequently the pretilting is indispensable to get a uniform display, the angle of which is 1° through 6° in general. Note that any liquid crystal display device is endowed with this pretilt.

As has been illustrated in FIG. 4b and FIG. 4c, therefore, the array of the liquid crystal molecules becomes asymmetric to the z axis particularly when the half tone is displayed. As for the polarized light obliquely impinging from +x axis to +z axis in FIG. 4b, the array of the liquid crystal molecules LM loses the tilting characteristic as if in the array with no voltage applied as shown by LM-L in FIG. 5, thus enabling to rotate largely the polarized plane. As a result, the intensity of the transmitting light becomes greater than that of the outgoing light as against the incident light parallel to the z axis. To the polarized light U inciding from the symmetric orientation (obliquely from −x axis to +z axis) with the opposed normal of substrate as reference, the array of the liquid crystal molecules LM becomes largely tilted as shown by LM-U in FIG. 5 as if further higher voltage were applied, disabling thus the polarized plane to be rotated. As a result, the intensity of the transmitting light becomes smaller than intensity of the outgoing light as against the incident light parallel to z axis. In the corresponding relationship to FIG. 23, the orientation of L in FIG. 23b and that of U in FIG. 4, to the lower orientation in FIG. 23b.

As has so far been explained, the orientation dependency of the transmitting light at half (intermediate) tone results from the asymmetric array of the liquid crystal molecules. Due to this asymmetry of array, the rotational angle (optical rotatory power) of the polarized face depends on the direction in which the light comes, which will result in change in the transmittance. In the case of TN-LCD, it may be that there is a tendency for the optical rotatory power to be generated in the upper orientation and the same power to be reduced in the lower one. In consequence, an addition of such optical anisotropic element that decreases the optical rotatory power in the upper orientation and generates the same in the lower one will contribute to the improvement of the viewing angle dependency of the liquid crystal display device. The essence of this invention consists in how to provide an optical anisotropic element having such characteristics.

Further, more concrete description of the optical anisotropic element by this invention is described.

Figure 6A:
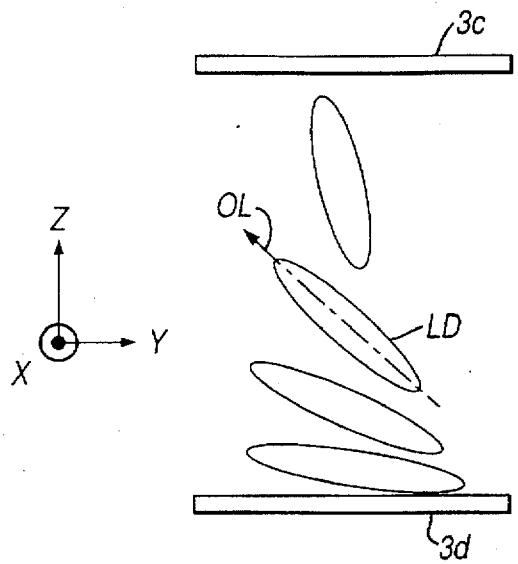
FIG. 6a through FIG. 6d are schematic diagrams that illustrates the alignment of the optical anisotropic element by this invention.
Figure 6B:
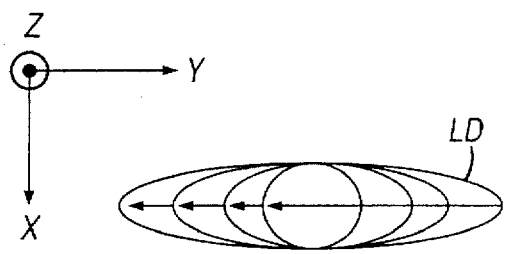
Figure 6C:
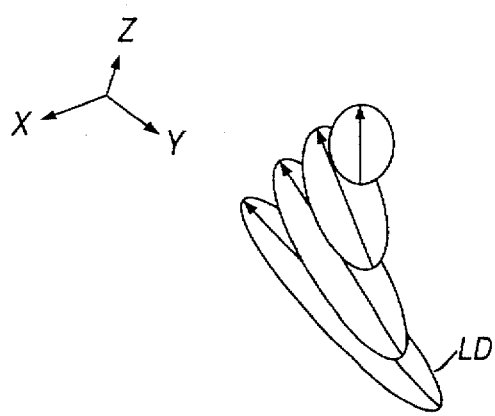
Figure 6D:
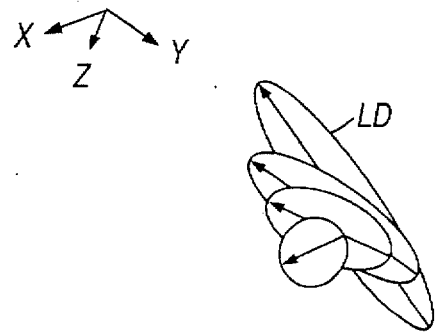

To describe briefly, the characteristic required for the optical anisotropic element is the "rotational direction of rotatory light in the upper orientation is reversed to that in the lower one." FIG. 6 illustrates the array of the optical axes in the optical anisotropic element according to this invention, while FIG. 6a depicts the cross sectional view of optical anisotropic element in an embodiment of this invention where the ellipse represents the optical anisotropic bodies that constitute the optical anisotropic element, the longer axis of this ellipse corresponding to the optical axis OL. From the lower substrate 3d over to the upper one 3c, the inclination of the longer axis changes continuously, being nearly parallel to the substrate face in the vicinity of the lower substrate 3d and substantially vertical to the same near the upper substrate 3c (hybrid alignment). FIG. 6b is a top view of this array. The arrows in the ellipses in this figure represent the orientation of optical axes. Note that the orientations of respective optical axes in the layer converge into a same plane, that is, are justified in a row on a single axis. FIG. 6c illustrates the array as viewed obliquely from the z axis. The directions of the slant are indicated by z, y, and x axes in the figure. FIG. 6d depicts the same, but viewed from reversed oblique direction. As is clear from FIGS. 6c and FIG. 6d, if the array of FIG. 6a viewed obliquely from z axis, the array twists leftward in the direction of progress increasingly as it progresses from lower to upper area in FIG. 6c, while it twists rightward in FIG. 6d. The optical anisotropic element with such oblique array contributes to the realization of the characteristic: "the rotational direction of the rotatory light is reversed in upper orientation from that in the lower one."

Now we describe how such optical anisotropic element should be combined with the driving liquid crystal cell in order to get a favorable compensating effect.

Figure 5:
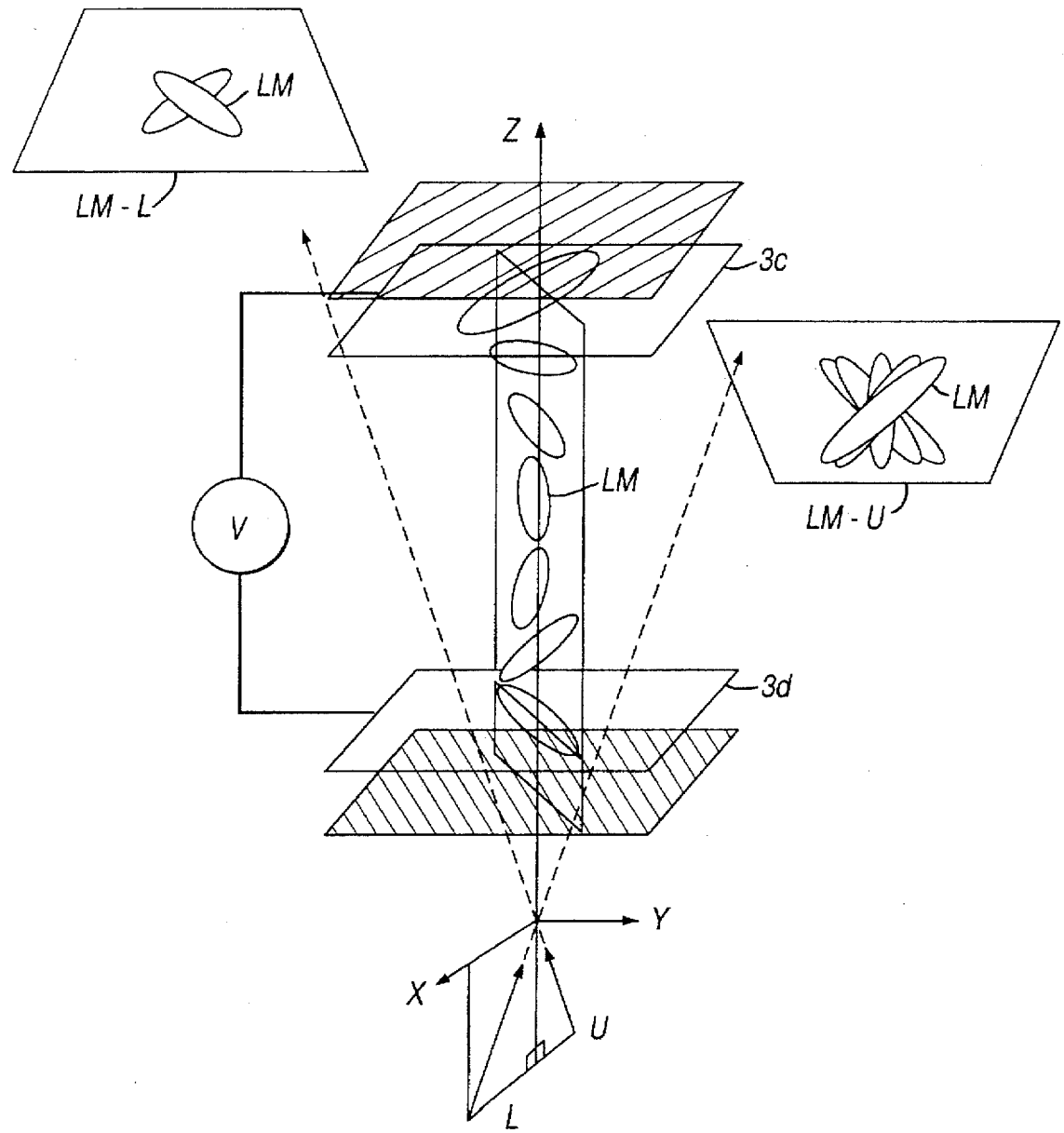
FIG. 5 is a diagram that illustrates how the viewing angle characteristics of TN-LCD are generated.
Figure 7A:
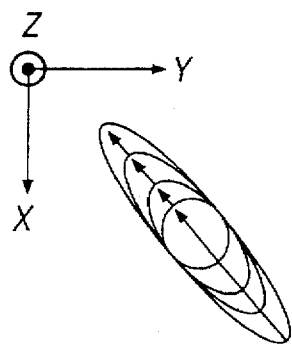
FIG. 7a through FIG. 7f are schematic diagrams that illustrates the principle of the optical compensation when the optical anisotropic element by this invention is used.
Figure 7B:
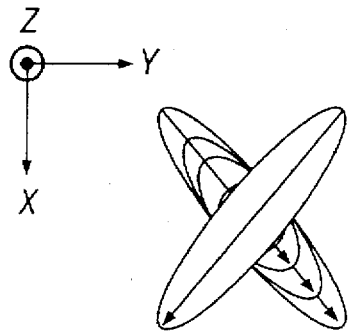
Figure 7C:
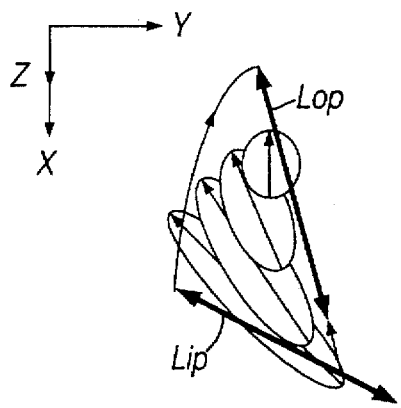
Figure 7D:
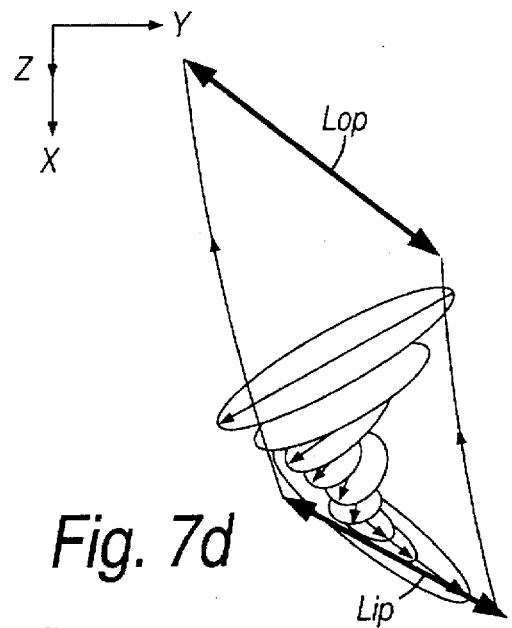

FIG. 7a illustrates the liquid crystal cell as shown in FIGS. 3, 4, and 5, adding arrows similar to those in FIG. 6, where the symbol Lip represents the polarized axis of incident light and Lop, that of outgoing light. FIG. 7a shows an optical anisotropic element and FIG. 7b shows the driving liquid crystal cell (TN) to which a voltage equivalent to half (intermediate) tone is applied, both as viewed from the z axis. FIG. 7c depicts the array of the optical axes of an optical anisotropic element as viewed throwing it from on z axis to +x axis where is shown the status of rotatory light when a straight polarized light comes in. In this direction, the optical anisotropic element is apt to rotate the polarized face of the incident light into the left direction (left rotatory power). FIG. 7d shows an array of drive cell viewed in the same was as in FIG. 7c.

The liquid crystal molecules are slanted due to the application of a voltage a little higher than the voltage equivalent to the half (intermediate) tone (critical or threshold voltage at which the liquid crystal can function). If viewed from this direction, there arises an alignment portion where the length of the liquid crystal molecules in the longer axis of ellipse is substantially equal to the length in the shorter axis direction. The polarized incident light, therefore, transmits without much rotation, and the direction of the polarized axis Lop of the outgoing light is nearly the same as the polarized axis Lip of the incident light. This causes the abnormal display called excessively dark image, which may be improved if the polarized light is rotated counterclockwise to intensify the optical rotatory power. The optical anisotropic element as shown above in FIG. 7c is suited to this improvement. The optical anisotropic element as shown in FIG. 7c has the left rotatory power, which makes up for the rotatory light lacking in the driving liquid crystal cell.

Figure 7E:
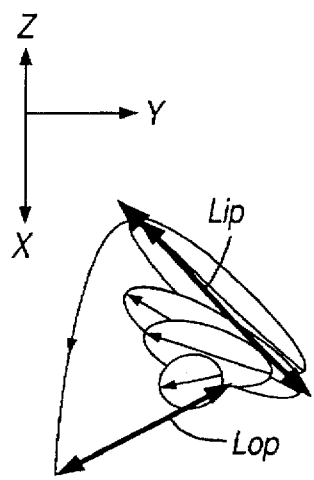
Figure 7F:
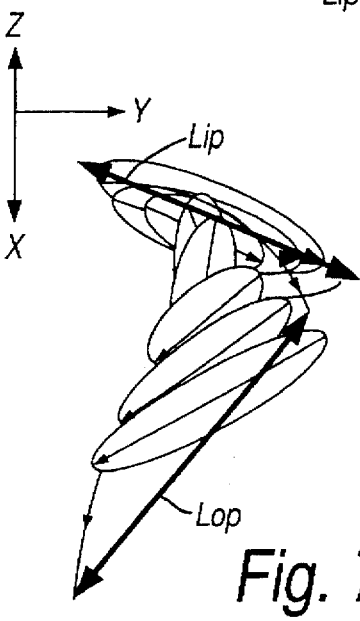

The same will be explained, but in reversed orientation, referring to FIG. 7e and FIG. 7f. The FIG. 7e and FIG. 7f represent the array of optical axes when the optical anisotropic element as shown in FIG. 7a is observed from the direction of z axis toward −x axis. This array has a characteristic to rotate clockwise the incident light shown (right rotatory power). FIG. 7f schematically shows a state with voltage of half tone applied as was the case with FIG. 7d. From this direction the liquid crystal molecules look like slanted though not in reality, and a large optical rotatory power is given for that reason. This may cause too bright a display, which is an abnormal display called "excessive bright image." If we apply, however, the right rotatory light that controls the counterclockwise rotatory light, excessive rotatory light can be dissolved to improve the "excessive bright image." The optical anisotropic element as shown in FIG. 7e has the right rotatory power, which if, combined with the drive cell, will acquire an improvement of characteristic.

Thus far we have illustrated the principle of enlarged viewing angle by example of an optical anisotropic element with hybrid alignment whose rotatory power in a direction slanted from the normal to the optical anisotropic element is greater than that in the direction of the normal. Further the optical anisotropic element with twisted hybrid alignment and one with uniformly tilted alignment between upper and lower substrates may present characteristics similar to those of the optical anisotropic element with hybrid alignment, which can be selected in terms of the design specification of the liquid crystal display device.

Figure 8A:
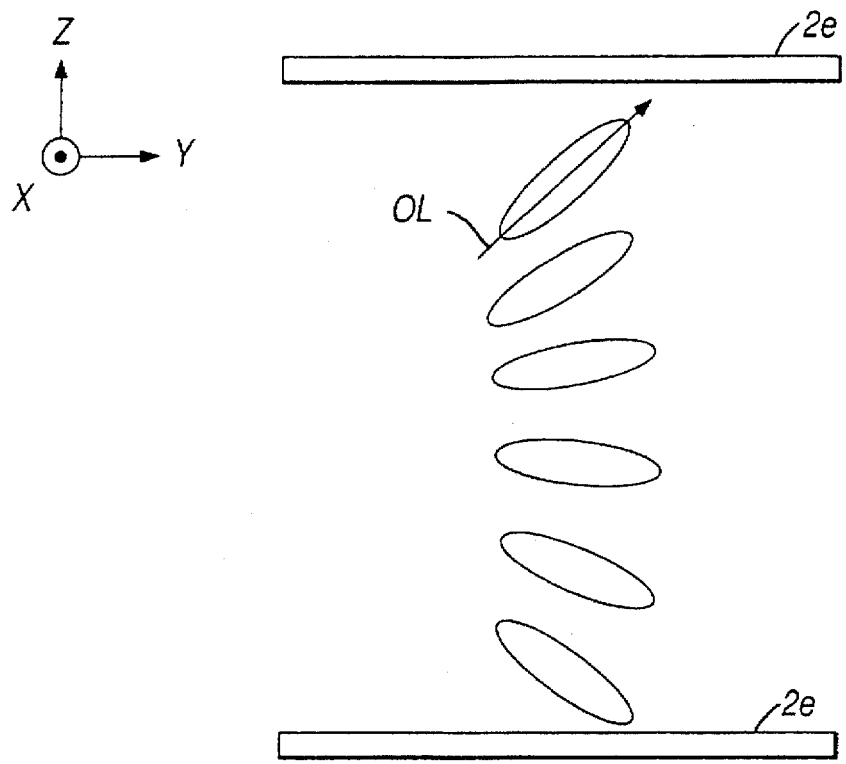
FIG. 8a through FIG. 8c are schematic diagrams that illustrates the principle of the optical compensation when the spray-aligned optical anisotropic element by this invention is used.
Figures 8B, 8C:
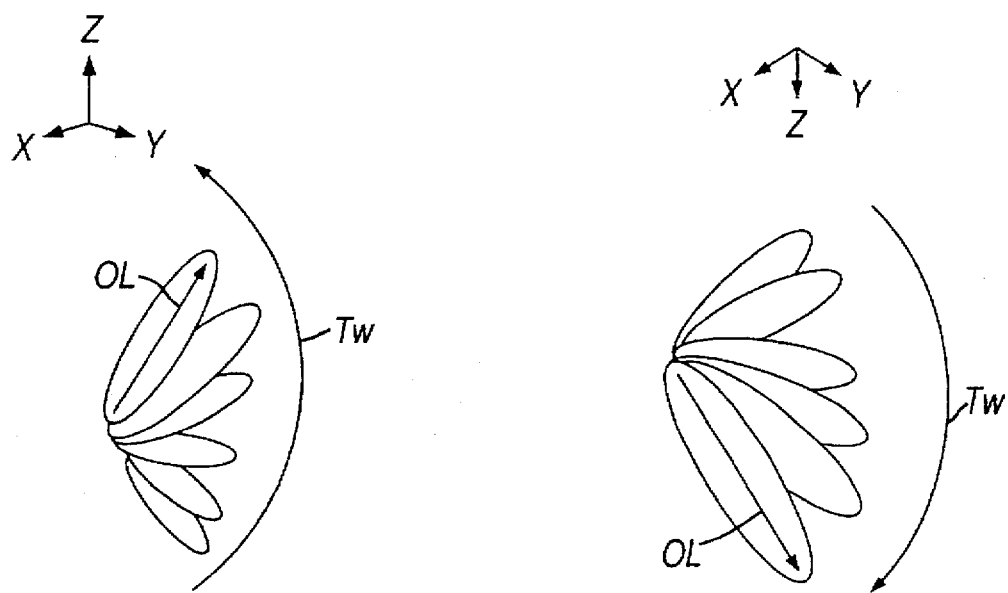

If an optical anisotropic element is used whose optical axis OL manifests a spray array in the layer between obverse and reverse, 2d and 2e, as shown in FIG. 8a, then the twist angle of the array as observed from the slanted direction shown by an arrow TW in FIG. 8b and FIG. 8c, the twist angle of the array can be improved to give a favorable compensation effect. The same applies to the bend array.

Though we have explained by example of TN, the same principle may be applied also to STN. This technique can therefore be used as a means to enhance the viewing angle of STN.

The optical anisotropic element has a great improvement effect mainly on such abnormal display as "excessively darkened image" and "excessively bright image." The inventors further discovered the fact that if additional optical anisotropic element with negative anisotropy with optical axes in the direction of optical anisotropic element is given, yet better enhancement effect can be exerted. Next, there is described the principle of improved viewing angle characteristic obtained when using the optical anisotropic element with negative anisotropy.

Figure 9:
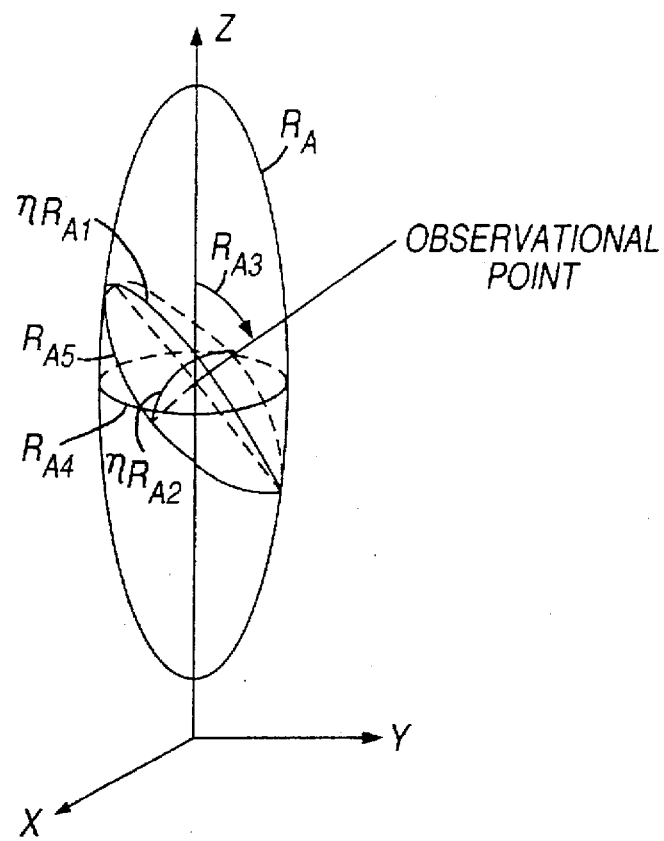
FIG. 9 is a schematic diagram showing the optical indicatrix of the drive cell when voltage is applied.

FIG. 9 represents the conditions of driving liquid crystal cell under which the voltage equal to or higher than the threshold voltage is applied to the cell, as expressed by a three-dimensional optical index shape (index ellipsoid). In this figure, the z axis exhibits the direction of the thickness of liquid crystal cell, whole x and y planes correspond to the substrate face of the liquid crystal cell. The phenomenon of birefringence is represented by the geometrical shape of elliptical cut face (called "index ellipsoid with two-dimensional plane") as formed when the normal plane on the central point of the optical indicatrix (index ellipsoid) RA of a line connecting an observation point when the central point of the liquid crystal cell is viewed from a direction on the one hand, and the central point of this optical indicatrix, on the other.

The difference between the longer axis and shorter one of this optical indicatrix within two-dimensional plane correspond to the phase difference (retardation value) between the ordinary and extraordinary lights, and if the transmission axes of the polarizers holding the liquid crystal cells in-between are orthogonal with each other, the transmitting light of the liquid crystal cells is intercepted if the retardation value is zero, and if the same value is not zero, the transmitting light corresponding to the retardation value and wavelength of the incident light is generated.

When the light enters vertically to the substrate face of the liquid crystal cell (namely, when the cell is viewed from a position directly opposite), the optical indicatrix RA4 in the two-dimensional plane becomes a circle, and the retardation value is zero between the ordinary and extraordinary lights. When the light enters from the direction RA1 slanted from the substrate face of the liquid crystal cell, the optical indicatrix RA5 becomes elliptic, retardation values produces a difference between the ordinary and extraordinary lights. Thus the polarized state of the light transmitting through the liquid crystal cell differs in the direction directly opposite and slanted direction.

As the viewing angle RA3, that is, the angle at which the optical indicatrix RA shown in FIG. 9 is seen, is made to grow, the optical indicatrix RA5 in the two-dimensional plane grows larger in the longitudinal direction, thereby showing a transmitting light larger than as viewed from the direction of the visual (viewing) axis RA1. Idealistically it is desirable that the optical indicatrix in the two-dimensional plane does not change in its geometrical shape in any orientation whatsoever when the viewing angle is changed.

Figure 10:
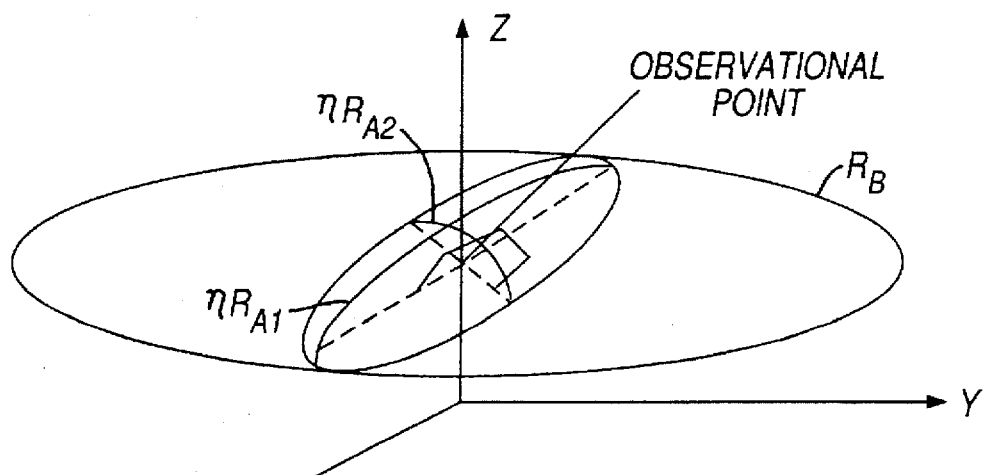
FIG. 10 is a schematic diagram showing the optical indicatrix of an optical anisotropic element whose refractive index anisotropy is negative in the thickness direction.

The optical compensation as above can be realized by placing the disk-like optical indicatrix RB as shown in FIG. 10 on the z axis of the optical indicatrix RA shown in FIG. 9. (namely, to be arranged just on or under the liquid crystal cell). Thus, when the viewing angle RA3 is made to grow gradually, the optical indicatrix RA5 in the two- dimensional plane of the optical indicatrix RA grows in the direction of length, while the refractive index of the optical indicatrix B increases in the direction of the length of nRA2. As a result, the optical indicatrix composed in the two-dimensional plane becomes circular, thereby enabling to compensate optically for the optical indicatrix A to improve the visual angle characteristic.

In an actual liquid crystal display device, the longer axis of the optical indicatrix of the driving liquid crystal cell is not perpendicular to the display plane as shown in FIG. 9, but a little slanted. In consequence, it is desirable that the shorter axis of the disk-like optical indicatrix B of the optical anisotropic element shown in FIG. 10 be slanted in response thereto to compensate for the above inclination.

Actually, such optical indicatrix as shown in FIG. 10 can be realized by constituting it with the optical anisotropic element composed of a layer of optical anisotropic substance having an array of continuously twisted optical axes or with some material whose refractive index is smaller in the in-plane direction than in thickness direction.

We now attempt to describe how to realize an optical anisotropic element with negative optical anisotropy composed of layers of optical anisotropic substance with optical axes in continuously twisted array.

Generally the liquid crystal cell performs the display, changing the polarization direction of the light with visible wavelength range (from 380 nm to 750 nm under normal conditions) by the voltage to be applied to the liquid crystal cell.

In the case of the optical anisotropic element for optical compensation according to this invention, the optical rotatory power may be produced depending on the optical conditions of the optical anisotropic element, because the optical axes of the layer of optical anisotropic substance are continuously twisted. The rotatory power in this context means the nature of the light whose vibrational direction rotates right or left about the advancing direction as the light progresses through the medium. Suppose now constant the retardation value of the optical anisotropic element whose optical axes are continuously twisted. If the twist pitch of optical axis is long, the light rotates its polarized face in accord with the twist of optical axes, while the light cannot follow the twist of optical axes if the twist pitch is too short, thus the optical rotatory power being not produced. If the optical rotatory power of the optical anisotropic element is great enough, the polarized face of the light transmitting through this element comes to be changed, resulting in reduced contrast, or in some cases, variations in polarized face due to the wavelength of the light. From this such problems may arise as coloring of the light which has transmitted through the optical anisotropic element.

It is therefore necessary that the optical rotatory power of the optical anisotropic element to the visible light be smaller than that of the driving liquid crystal cell to the visible light. The optical rotatory power largely depends on the wavelength of the light passing through the medium and on this medium itself. The largeness of the optical rotatory power is expressed by the degree of the change in retardation value of the medium to the change in optical axes.

Therefore, the largeness of the optical rotatory power of the driving liquid crystal cell may be expressed by the following formula:

$$\Delta n1 \times d1/T1 = R1/T1 \quad [1.1]$$

where $R1 = \Delta n1 \times d1$ (retardation value)

$\Delta n1$: difference of the refractive index no of the liquid crystal of the driving liquid crystal cell to the ordinary light from the refractive index to the extraordinary light ne (=ne−no: refractive index anisotropy)

d1: thickness of liquid crystal layer

T1: angle of the twisted array of liquid crystal layer (twist angle)

Similarly, the largeness of the optical rotatory power of optical anisotropic element for compensation can be expressed by the following formula:

$$\Delta n2 \times d2/T2 = R2/T2 \quad [1.2]$$

where $$R2 = \Delta n2 \times d2$$

$\Delta n2$: refractive index anisotropy of the optical anisotropic substance layer of optical anisotropic element for compensation d2: thickness of the laminated optical anisotropic substance layer T2: total twist angle of the optical axes of the optical anisotropic substance layers.

From the formulas [1.1] and [1.2], the largeness relationship of the optical rotatory power of optical anisotropic element for compensation with that of the driving liquid crystal cell can be represented by the following formula:

ti $(R1/T1) > (R2/T2)$ [1.3]

The propagation of the light through the optical anisotropic element whose optical axes of optical anisotropic substance layer is twisted continuously may be represented by the parameters shown by the following formula (C.Z Van Doorn, *Physics Letters* 4, 2A, 7 (1973)).

$$f = \lambda/(p \times \Delta n) \quad [1.4]$$

where $\lambda$=wavelength of the light in vacuum (visible wavelength range)

p=twist pitch length of optical axes (p=d/T).

If f<<1, the polarized face of the light in the optical anisotropic element changes pursuant to the twist angle acquiring thus the optical rotatory power. As has been described earlier, the optical anisotropic element is desired to have small rotatory power and must satisfy the condition f>>1. From formula [1.4], $$p \times \Delta n < \lambda \quad [1.5]$$

should hold for the optical anisotropic element.

Any liquid crystal with extremely large twist angle, namely with shorter helical pitch is called "cholesteric liquid crystal" in general. If the product (n×p) of the length of the helical pitch of this liquid crystal, p and the average refractive index of the cholesteric liquid crystal, n falls into the visible wavelength range (depending on conditions, 360 nm to 400 nm for the extreme of short wavelength and 760 nm to 830 nm for long wavelength extreme), there arises selective scattering (J. L. Fergason; *Molecular Crystals*. 1.293 (1966)). Such a phenomenon is observed not merely in the cholesteric liquid crystal cell, but also in the optical anisotropic element whose optical axes of optical anisotropic body are continuously twisted. if the selective scattering occurs, the coloring phenomenon of optical anisotropic element produces to change the display color. This coloring phenomenon can therefore be prevented if the visible wavelength range excludes the product n×p of the average refractive index of the optical anisotropic substance layer constituting the optical anisotropic element and the twisted pitch of the optical index p.

Further the optical anisotropic element can be made from laminated retardation film in which optical anisotropy has been developed by drawing high molecular film, liquid crystal cell with twisted array, and thin film in which the high molecular liquid crystals are twist-arranged. In this case the optical anisotropic element can be had by applying this high molecular layer on at least one of the substances of the driving liquid crystal cell. This process facilitates the production and allows to get more desirable liquid crystal display device. For instance, one can use such high molecular copolymer as having polysiloxane as principal chain and suitable proportional ratio of biphenil benzoate and cholesteryl group as side chains. The optical anisotropic element by this invention can be realized also using some liquid crystal having such polymerisable functional group using acryoyloxy group which hardens by ultraviolet.

Described in the following examples are preferred embodiments of the liquid crystal display device to illustrate the invention.

Embodiment 1

Figure 1:
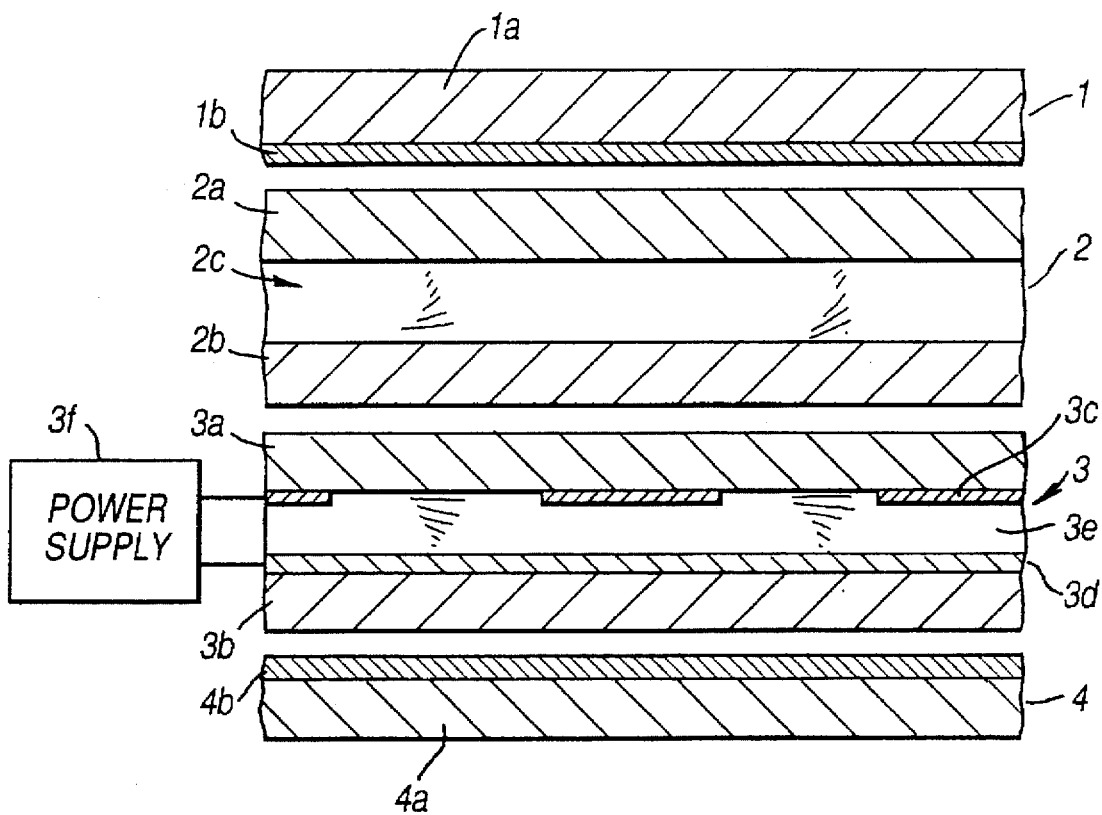
FIG. 1 is a cross-sectional view showing the constitution of embodiment 1 by the invention.

FIGS. 1 and 2 represent the cross-sectional views of the liquid crystal display device in this embodiment. The liquid crystal display device consists of two polarizers 1 and 4 (LLC2-92-18: manufactured by SANRITZ) and the liquid crystal cell 2, which uses a liquid crystal element for viewing angle compensation, and driving liquid crystal cell 3, both held between the polarizers. The polarizer 1 is a transparent substrate 1b inside of which is held a polarizer film 1a, and the polarizer 4 is a similar substrate 4b to which is applied a polarizer film 4a.

The liquid crystal cell 2 for visual angle compensation as an optical anisotropic element is provided between the polarizers 1 and 4, and liquid crystal cell 2c between the transparent substrates 2a and 2b. On the surface of the substrates 2a and 2b, $SiO_2$ is oblique-evaporated, and introduced therebetween is an optical anisotropic substance layer which is a liquid crystal layer wherein chiral agent S811 (manufactured by E. Merck Co., Ltd.) is mingled into twisted nematic liquid crystal at 270° of twist angle, and the molecular liquid crystal is twisted counterclockwise (left twist) from the lower substrate 2b toward upper substrate 2d all maintaining 50° of pretilt angle. The difference $\Delta n$ of the liquid crystal material as optical anisotropic substance layer used for liquid crystal cell 2 for visual angle compensation is 0.189, helical pitch 1.33 micron, and layer thickness 1 micron.

The driving liquid crystal cell 3 is arranged between the liquid crystal cell for visual angle compensation 2 and the polarizer 4. Two substrates, upper 3a and lower 3b constitute respectively the transparent electrodes 3c and 3d which are connected to the drive power supply 3f. Introduced at 90° of angle between the substrates 3a and 3b are the twisted nematic liquid crystal (ZL1-4287, of Merck Co., Ltd.) with positive dielectric anisotropy to which is mingled the chiral agent S811 (of Merck Co., Ltd.), which alter the state in response to the voltage applied from the drive power supply 3F. The twisted arrangement is maintained when no voltage is applied.

The difference $\Delta n$ of the liquid crystal used for the driving liquid crystal cell is 0.093, the thickness of the liquid crystal layer is 5.5 micron. The molecular liquid crystal of the liquid crystal for drive 3 is twisted counterclockwise (left twist) from the lower substrate 3b toward the upper substrate 3b. This cell 3 functions as TN cell with 90° twist angle and optically control by rotatory action.

Figure 2A:
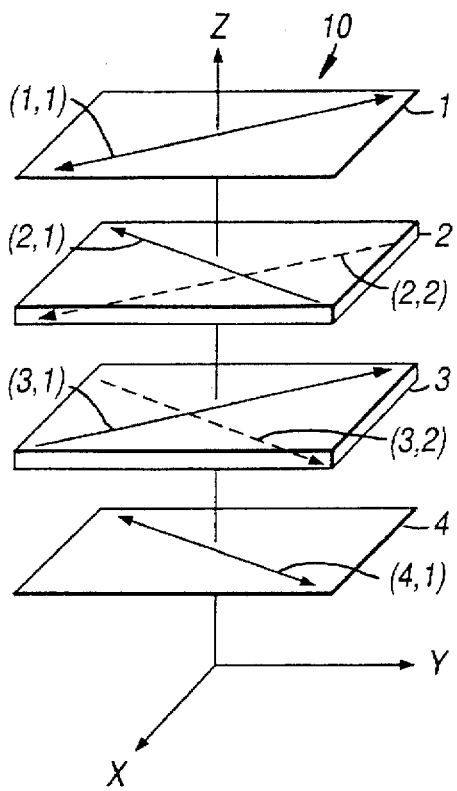
FIG. 2 a is an exploded perspective view illustrating the embodiment 1 by the invention and FIG. 2b shows an illustration showing the coordinate system for measuring the electro-optical characteristics.

FIG. 2a is an exploded perspective diagram showing the composition of the liquid crystal display device in this embodiment. (1.1) and (4.1) represent respectively the transmission axes of the polarizers 1 and 4, which are orthogonal (1.1) with each other and arranged at 135° counterclockwise viewed from the +z direction which is the normal direction of the substrate to the y axis. (3.1) and (3.2) are the rubbing axes; namely, alignment directions of the upper substrate 3a and lower substrate 3b of the driving liquid crystal cell 3, which are orthogonal with each other and arranged at an angle 45° between y axis and rubbing axis (3.1) counterclockwise viewed from the +z direction The optical anisotropic elements (2.1) and (2.2) of the liquid crystal cell 2 for viewing angle compensation are the rubbing axes of the upper and lower substrates 2a and 2b respectively, which are orthogonal with each other, and the liquid crystal cell for visual angle compensation 2 is so arranged that the rubbing axis (2.2) is parallel to the rubbing axis (3.1) of the driving liquid crystal cell 3. That is, the optical axis OL (FIG. 6) of the molecular liquid crystal LM is placed along these rubbing axes to be the optical axes of the liquid crystal layer on the side on which the liquid crystal layer comes in contact with the rubbed face of the substrate.

The polarizer 1 has been so arranged that the transmission axis (1.1) runs orthogonal with the rubbing axis (2.1) of the liquid crystal cell 2 for viewing angle compensation as an optical anisotropic element.

Figure 2B:
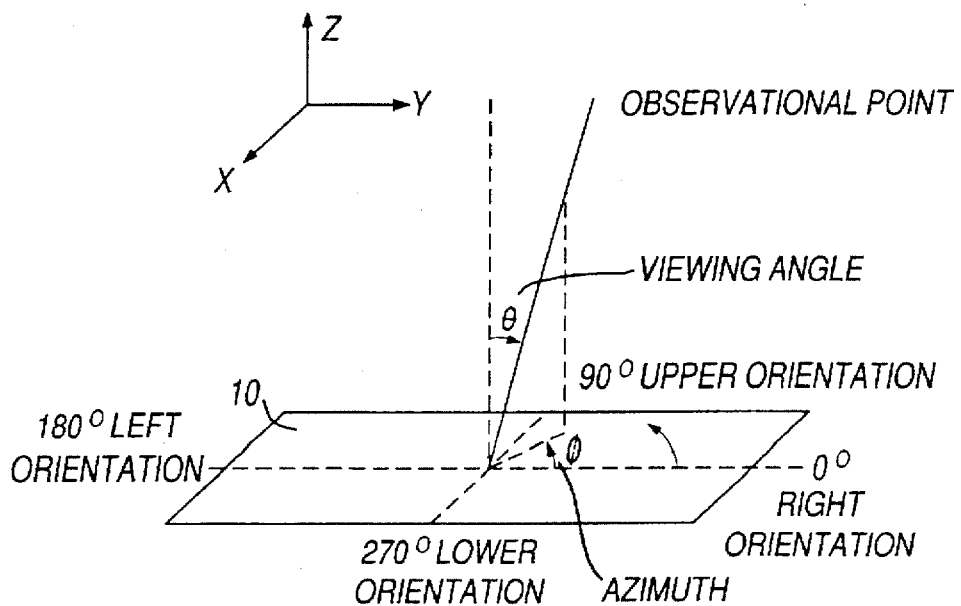
Figure 11:
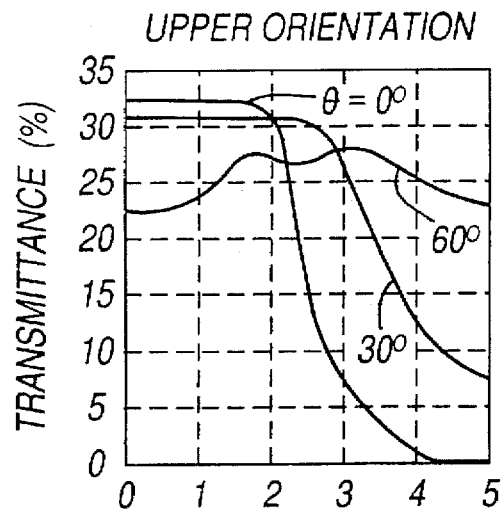
FIG. 11 is graphs showing the electrooptic characteristics of the liquid crystal display device in embodiment 1 of this invention.
Figure 11:
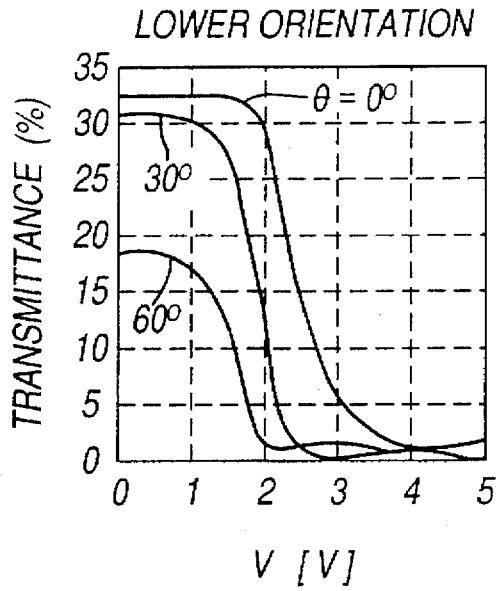
Figure 11:
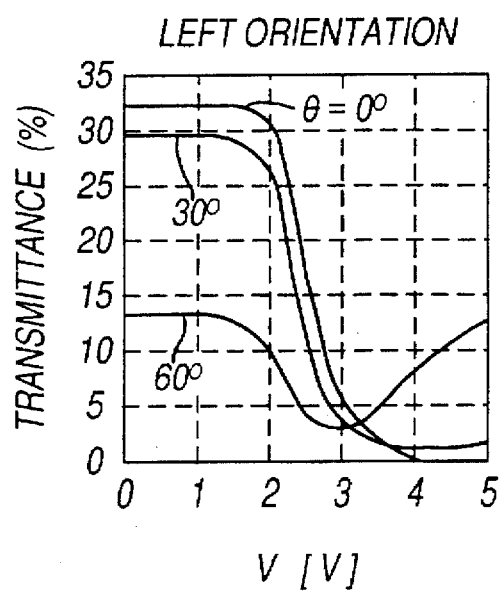
Figure 11:
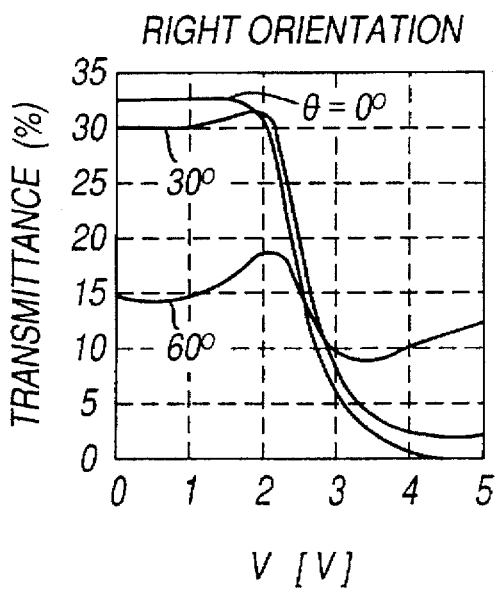

The electrooptic characteristics of the liquid crystal cell display device of the present constitution were measured in the coordinate system as shown in FIG. 2b. The voltage in the measurement (voltage to be applied between the electrodes 3c and 3d of the driving liquid crystal cell 3 from the drive power supply 3f) was varied from 1V to 5V. The results of this measuring are shown in FIG. 11. This figure, which shows the applied voltage-transmittance characteristic in four orientations (up and down, right and left) indicating the transmittance when the viewing angle is varied from front face to 60° by 30°. Idealistically the transmittance should be identical with the transmittance curve at the frontal face (visual angle $\theta=0°$) at any viewing angle. In the frontal direction, the transmittance reduces with the increase of voltage when a certain voltage is exceeded.

Figure 12:
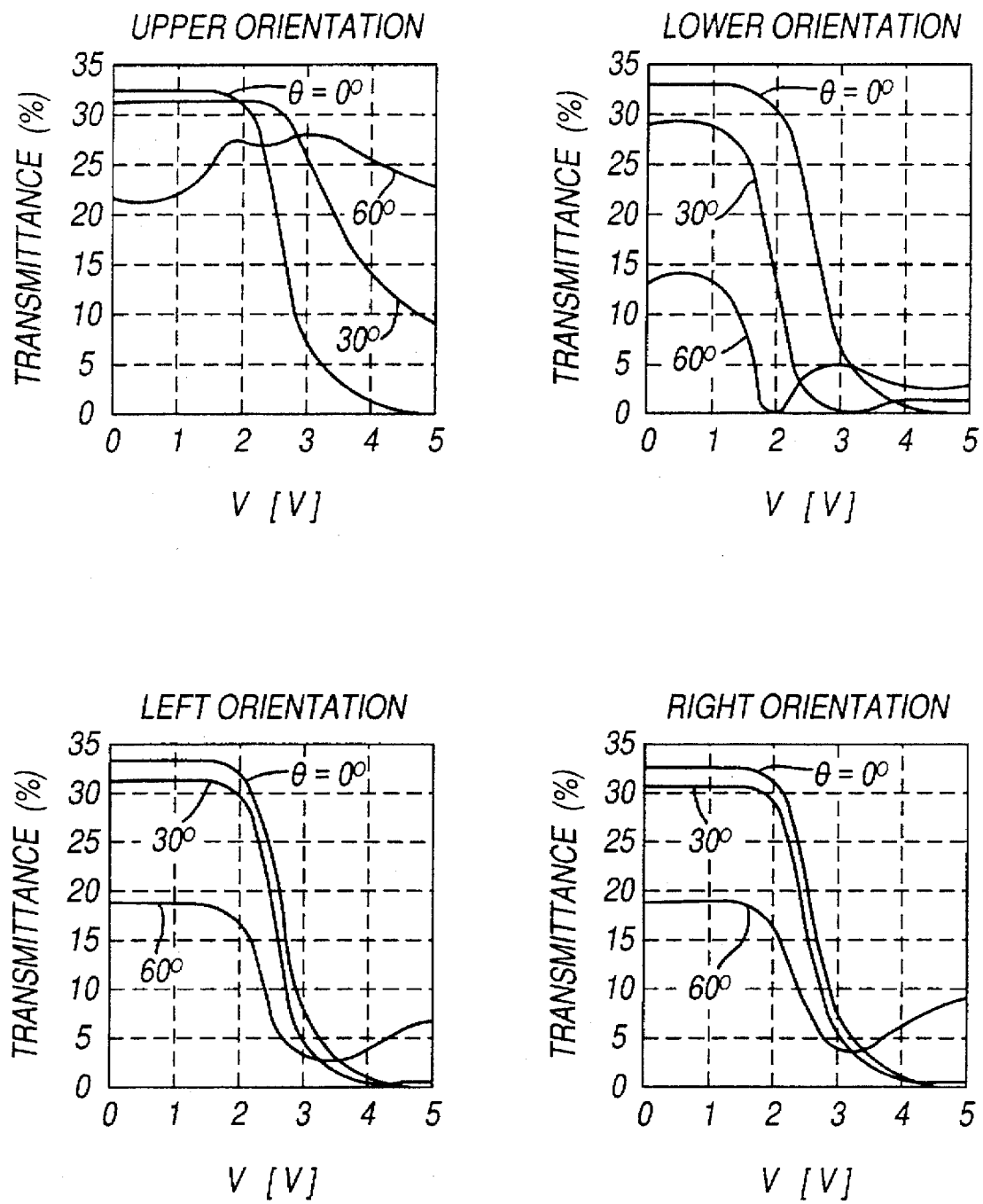
FIG. 12 is graphs showing the electrooptic characteristics of the liquid crystal display device in prior art.

FIG. 12 represents an applied voltage-transmission characteristic of a TN-LCD in the comparison example of conventional art. the characteristic of the lower orientation is that the transmittance decreases as the visual angle increases. This phenomenon is equivalent to the fact that the "excessive darken image" arises actually when the tonal display (assigning intensity level) is made. The re-increase of the transmittance near 3V at 60° visual angle corresponds to the "reversing" (inverse-video) in the actual display. As far as is concerned the upper orientation, the transmittance increases as the visual angle increases from 0° to 60° at 3V of voltage level, which corresponds to the "excessively bright image in the real display.

In this embodiment, it is understood that the reduced transmittance in the lower orientation and the re-increase of transmittance near 3V level have been improved (FIG. 11). In other words, improved have been the "excessively dark image" and the reversing in the lower orientation. Comparison of transmittance at 30° and 60° visual angles in the range from 3V to 5V reveals that the "excessively bright image" in the upper orientation has been more or less improved.

As a result of manufacturing TFT-LCD with diagonal 10-inch screen size provided with color filter in the liquid crystal cell according to the present configuration, we could get a good full color display allowing thus to identify any contents of display despite varying orientation and visual angle.

COMPARISON EXAMPLE 1

In the first embodiment we measured the voltage-transmittance characteristic when there existed no liquid crystal cell 2 for visual angle compensation. The results of this measurement are shown in FIG. 12. This comparison example revealed a phenomenon that the display brightens in the upper orientation and it darkens or the gradation reverses in the lower orientation, both depending on the angle.

COMPARISON EXAMPLE 2

Figure 14:
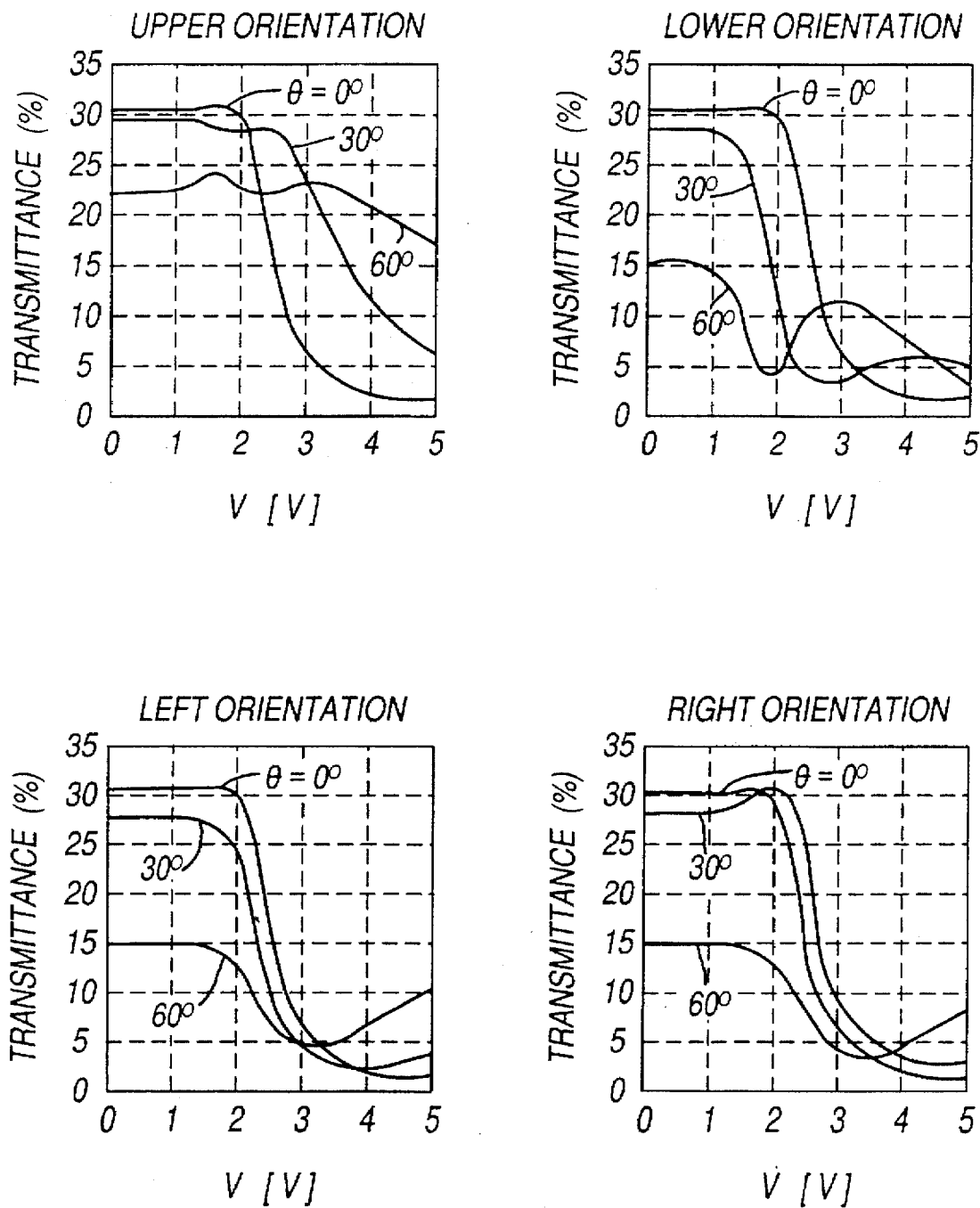
FIG. 14 is graphs showing the electrooptic characteristics in comparison example.

Manufactured in the first embodiment was an alignment film for liquid crystal cell 2 for visual angle compensation from polyimide with 1° of tilt angle. Any other conditions were all identical with those in the first embodiment. FIG. 14 shows the measurements of the voltage- transmission characteristics. Reduced pretilt angle of the liquid crystal cell 2 for visual angle compensation prevents the transmittance in frontal direction from lowering completely, thereby reducing the contrast. As is evident with the characteristic curves as shown in FIG. 12 of conventional example, the oblique characteristic was worse in all the orientations except the upper one.

Embodiment 2

Figure 13:
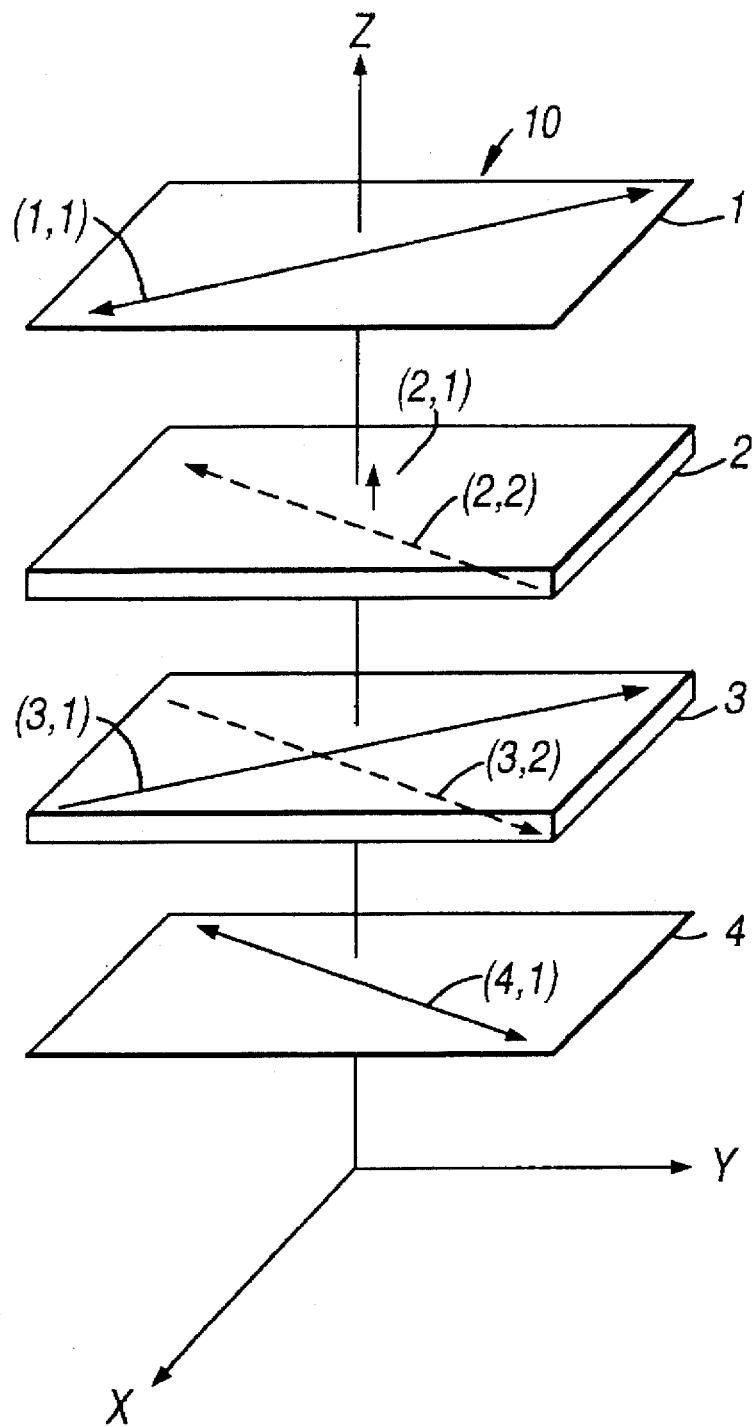
FIG. 13 is an exploded perspective view illustrating the configuration of embodiment 2 according to this invention.

FIG. 13 is an exploded perspective diagram showing the constitution of the liquid crystal display device in this embodiment. In the embodiment 1, polyimide AL-1051 (manufactured by Japan Synthetic Rubber Co., Ltd. ) has been applied on both sides of the lower substrate 2b contacting with the liquid crystal cell 2 for visual angle compensation which is an optical anisotropic element. Rubbing has been processed on the surface of this coating. The pretilt angle is 1° in this case. On the other hand, vertical alignment is processed on the side contacting with liquid crystal of the upper substrate 2a. The differential Δn is 0.039, and the thickness of the liquid crystal layer is 4.4 micron. The optical axis of the liquid crystal molecule, namely that of the optical anisotropic element runs parallel on the side of the driving liquid crystal cell 3 and goes substantially along the normal of the cell substrate on the side isolated from the liquid crystal cell 3 continuously changing in the direction of the layer thickness. The twist angle is 0°

(1.1) and (4.1) are the transmission axes of polarizers 1 and 4 respectively, which run orthogonal to each other, and (1.1) is arranged at 135° to the y axis counterclockwise viewed from +z direction. (3.1) and (3.2) are the rubbing axes of the upper and lower substrates 3a and 3b for the liquid crystal cell 2 for visual angle compensation which run orthogonal to each other and arranged at 45° of angle with the rubbing axis (3.1) to the y axis counterclockwise viewed from +z direction.

The optical axis (2.2) of the liquid crystal cell 2 for visual angle compensation is the rubbing axis of the lower substrate 2b, which runs orthogonal to the rubbing axis (3.1) of the upper substrate for the driving liquid crystal cell 3 to be parallel with the rubbing axis (3.2) of the lower substrate.

The transmission axis (1.1) of the polarizer 1 has been provided parallel to the rubbing axis (3.1) of the upper substrate for the driving liquid crystal cell 3.

Figure 15:
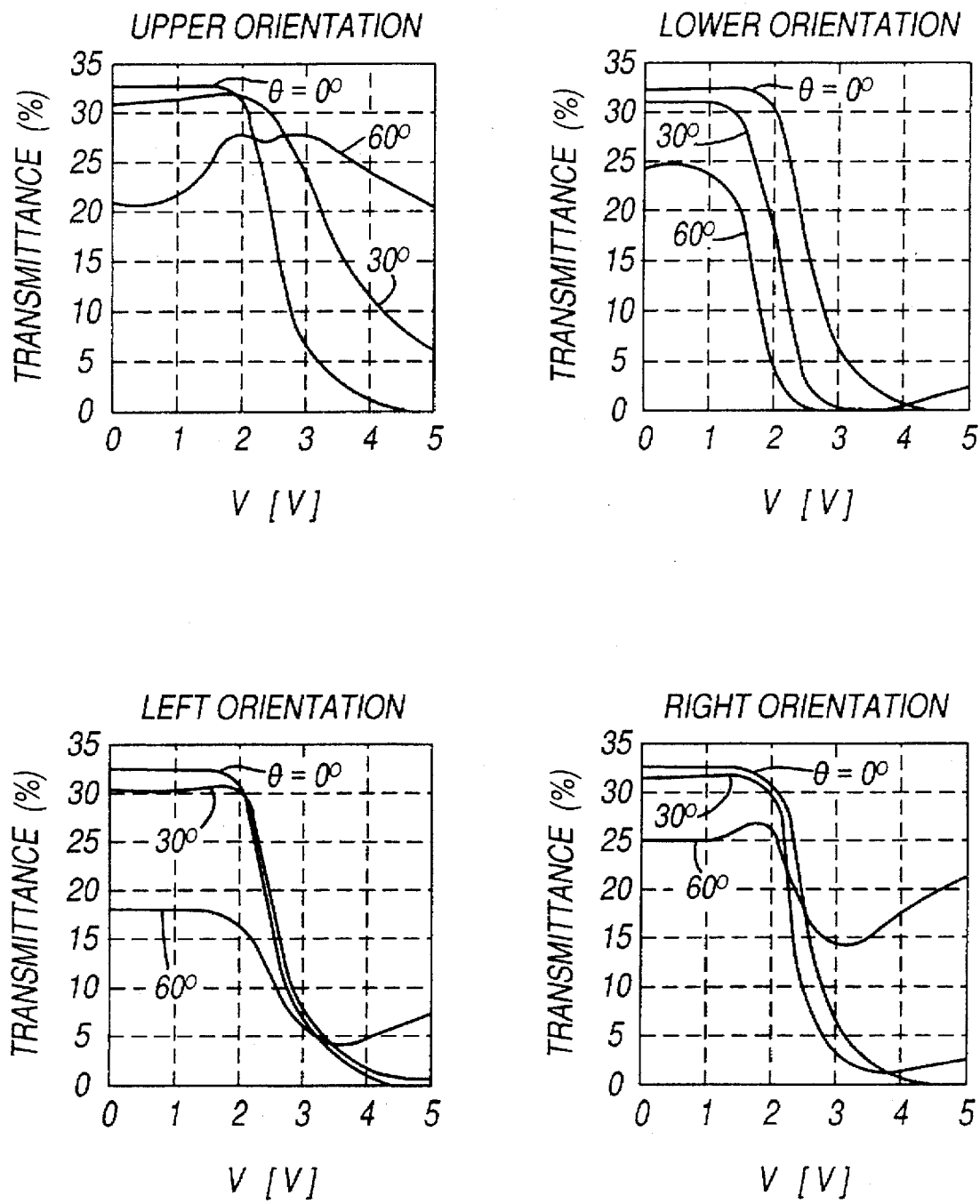
FIG. 15 is graphs showing the effects of embodiment 2 of this invention; of embodiment 3 of this invention.

The electrooptic characteristics of the liquid crystal cell display device of the present constitution were measured in the coordinate system as shown in FIG. 2b. The voltage in the measurement (voltage to be applied between the electrodes 3c and 3d of the driving liquid crystal cell 3 from the drive power supply 3f) was varied from 1V to 5V. The result of this measuring are shown in FIG. 15. Compared with the voltage-transmittance characteristic of Comparison example 1 (FIG. 12) the excessively dark image and reversing was reduced with enlarged viewing angle in upper and lower orientations, in particular in this latter orientation. The manufacturing of TFT-LCD with 10- inch diagonal screen size with color filter provided in the liquid crystal cell in conformity to the present embodiment revealed a satisfactory full color display that allows to identify the contents of display despite varying orientation and visual angle.

Embodiment 3

Figure 16:
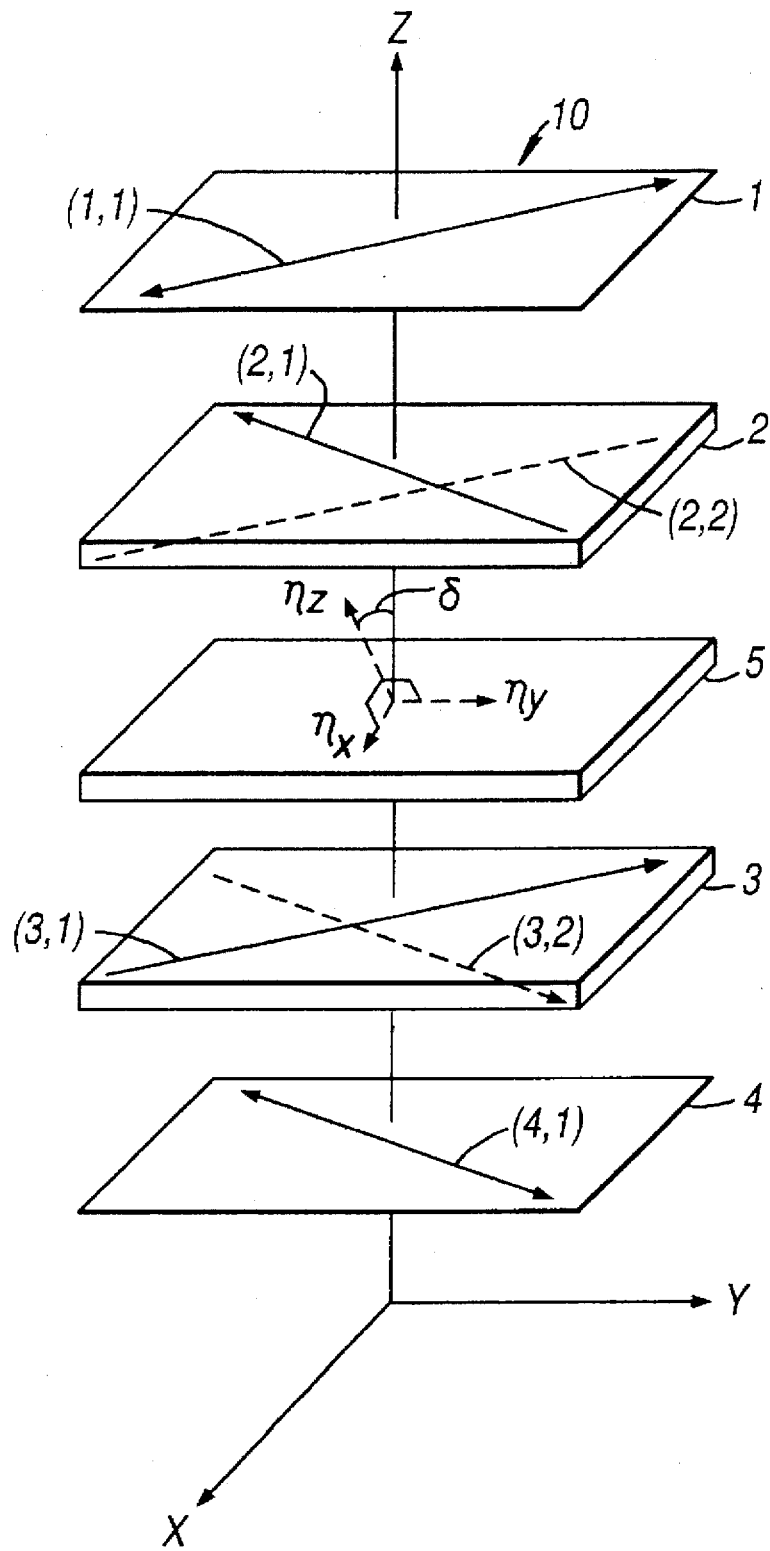
FIG. 16 is an exploded perspective view showing the configuration
Figure 17:
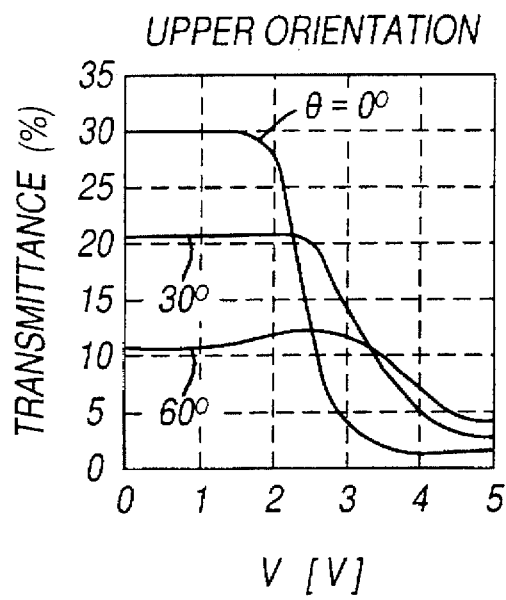
FIG. 17 is graphs showing the effects of embodiment 3 of this invention.
Figure 17:
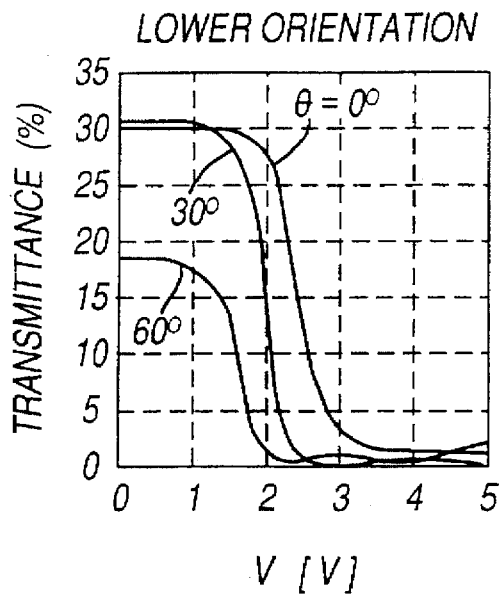
Figure 17:
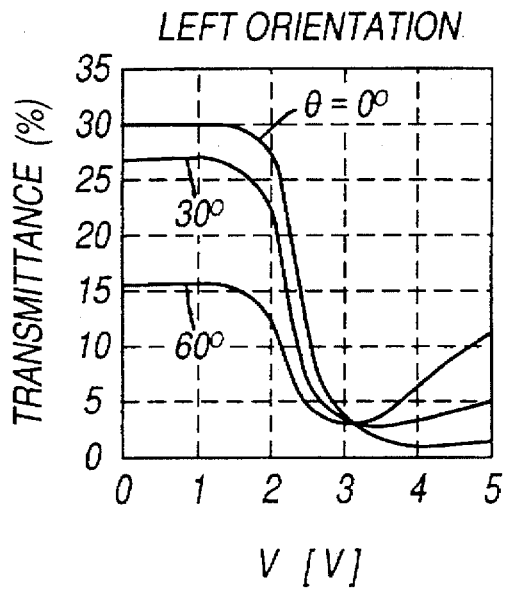
Figure 17:
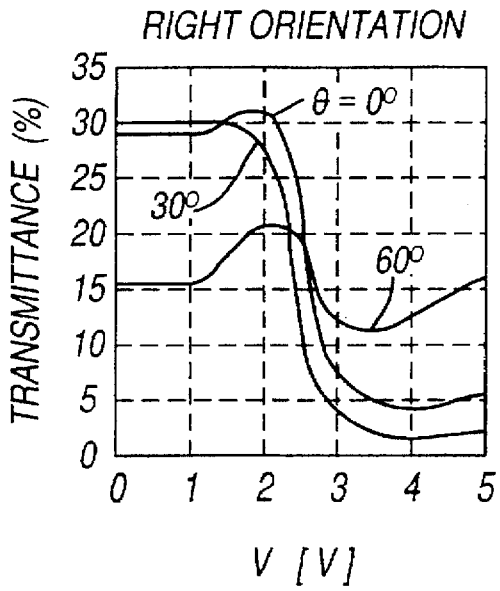

FIG. 16 represents an arrangement of this embodiment. In Embodiment 1, an optical anisotropic element 5 which is the second optical anisotropic element whose optical anisotropy is negative when the optical axis is in the thickness direction was provided between the liquid crystal cell 2 for visual angle compensation which is the first optical anisotropic element, and the driving liquid crystal cell 3. The optical anisotropic element 5 has its optical axis (n2 in FIG. 16) tilted by 60° (δ) between the z axis in the thickness direction and x-z plane, and the refractive index at the normal plane of this optical axis is greater than that in the optical axial direction. The retardation value is −140 nm. FIG. 17 shows up the results of the measuring of electrooptic characteristics of the optical anisotropic element by this embodiment in the orientation as defined on the coordinates shown in FIG. 2b. As is clear from a comparison with FIG. 12 which is the characteristic diagram in the comparison example 1, the characteristic in the upper orientation in Embodiment 1 has further been improved.

Embodiment 4

Figure 18:
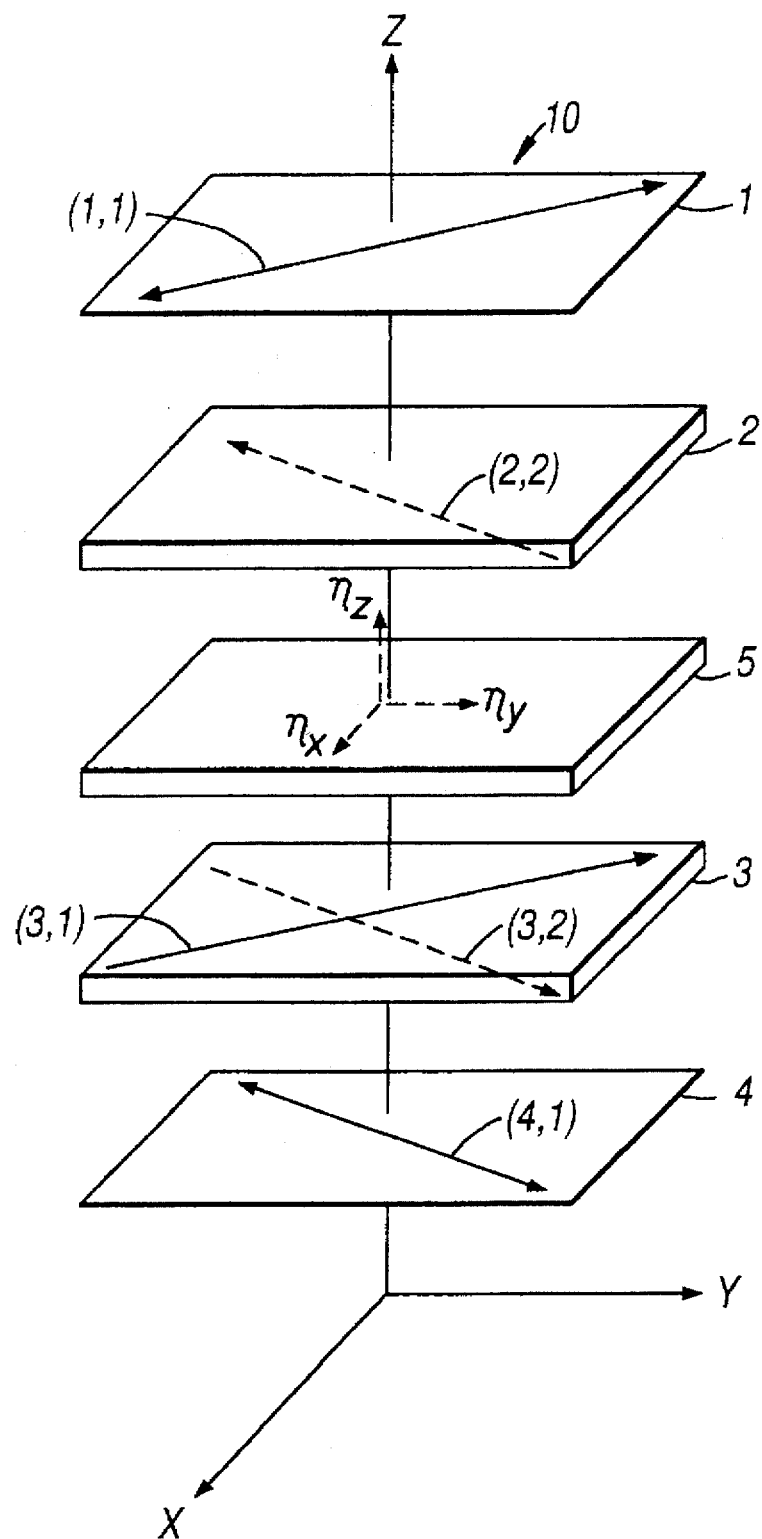
FIG. 18 is an exploded perspective view showing the configuration of embodiment 4 of this invention.
Figure 19:
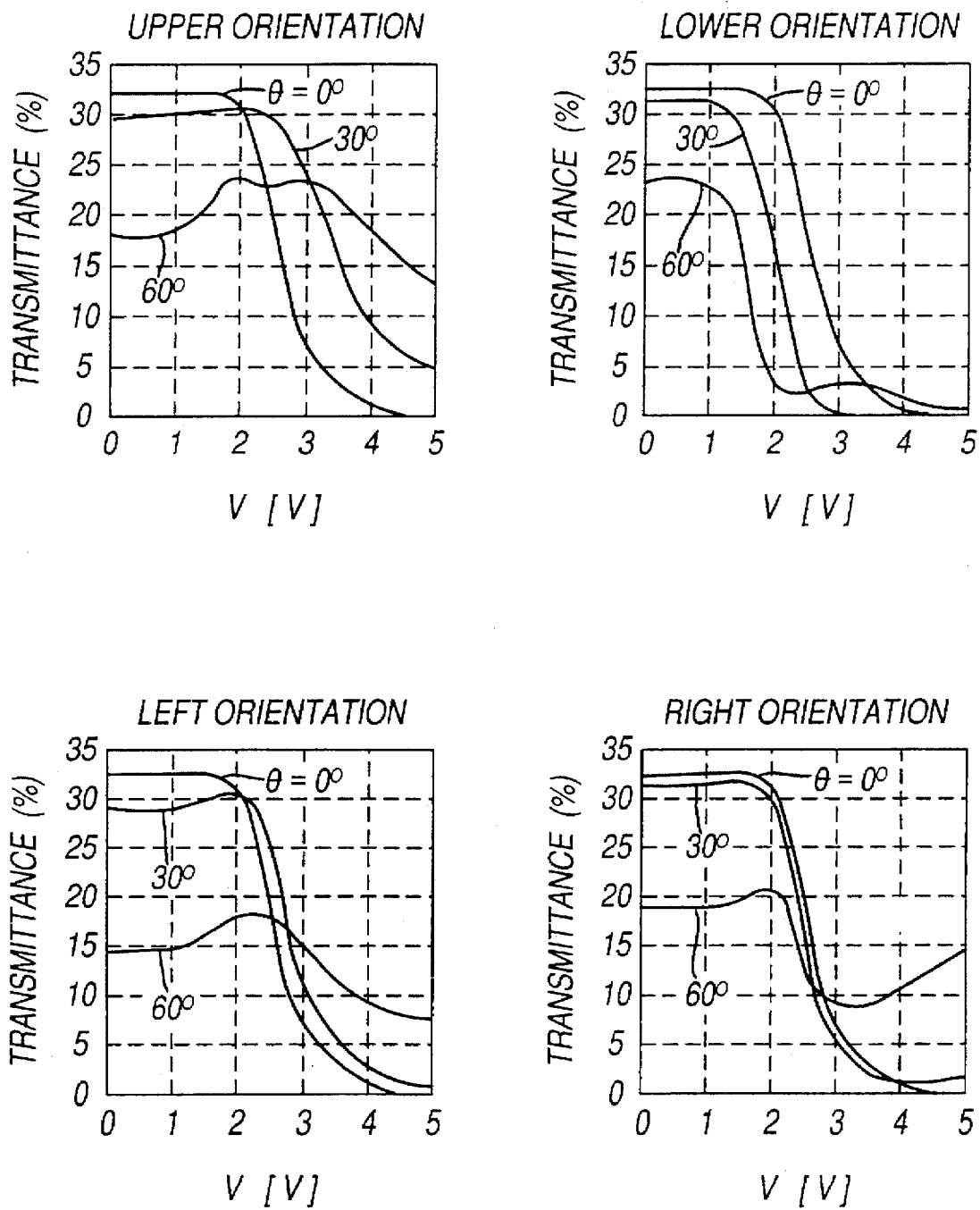
FIG. 19 is graphs showing the effects of embodiment 4 of this invention.

FIG. 18 shows the configuration of this embodiment. An optical anisotropic element 5 with negative optical anisotropy was provided as the second optical anisotropic element between the liquid crystal cell 2 for visual angle compensation identified as the first optical anisotropic element in Embodiment 2 and the driving liquid crystal cell 3. FIG. 18 shows up this constitution. The liquid crystal cell 5 has an optical axis (nz in FIG. 18) parallel to z axis, and the refractive index at the normal plane of this optical axis is greater than that in the optical axial direction. The retardation value is −140 nm. FIG. 19 shows up the results of the measuring of electrooptic characteristics of the optical anisotropic element by this embodiment in the orientation as defined on the coordinates shown in FIG. 2b. As is clear from a comparison with the characteristic diagram 12 in the comparison example 1, the characteristic in the upper orientation in Embodiment 2 has further been improved.

Embodiment 5

Figure 20:
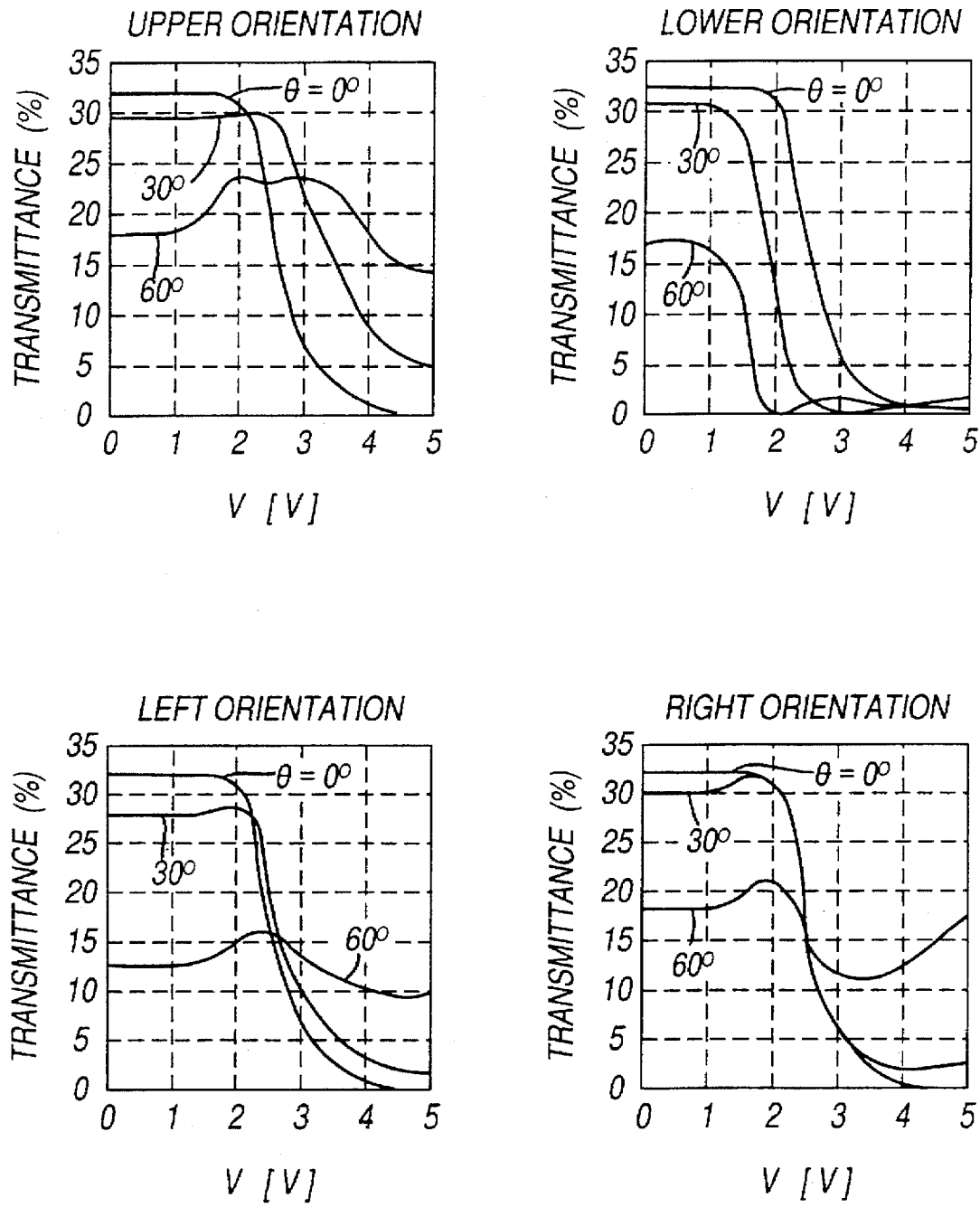
FIG. 20 is graphs showing the effects of embodiment 5 of this invention.

Provided in Embodiment 2 was the second liquid crystal cell for viewing angle compensation with 720° twist angle between liquid crystal cell 2 for viewing angle compensation and driving liquid crystal cell 3. The differential Δn is 0.039 and pitch length 3.5 micron. The liquid crystal layer is 7.0 micron in thickness and horizontally aligned by rubbing the polyimide films so that they are opposed to each other in the upper and lower substrates. The second cell for compensation was is arranged that the rubbing axis of the cell for compensation should be parallel to the rubbing axis of the substrate below the cell 3 for drive. FIG. 20 manifests the electrooptic characteristics of the optical anisotropic element by this constitution measured according to the orientation as defined in the coordinate system as shown in FIG. 2b. As is clear from comparison with the characteristic diagram 12 in Comparison example 1, the characteristic in upper orientation in Embodiment 2 could be enhanced.

Embodiment 6

Figure 21:
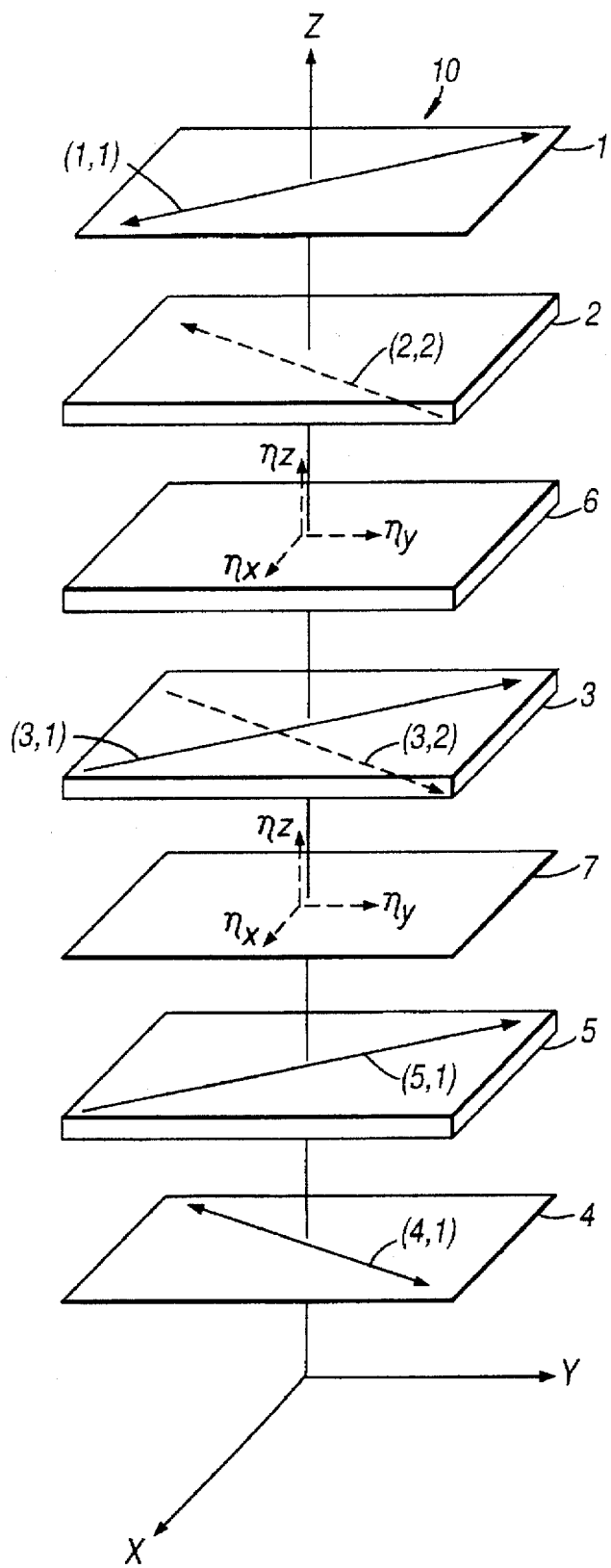
FIG. 21 is an exploded perspective view showing the configuration of embodiment 6 of this invention.

Provided in Embodiment 2 and as shown in FIG. 21 was optical anisotropic element 6 composed, on the one hand, of the liquid crystal cell 2 for visual angle compensation which is an optical anisotropic element whose optical anisotropic substance layer comprises crystal liquid layers, and the driving liquid crystal cell 3, on the other. The optical axis (nz in the figure) of the optical anisotropic element 6 runs parallel to the z axis, and the refractive indices nx and by on the normal plane of this optical axis are larger than that in the direction of the optical axis. The retardation value is −100 nm. The thickness of the liquid crystal layer of the liquid crystal cell 2 for visual angle compensation is 3.4 micron.

Arranged on the side of the driving liquid crystal cell 3 between this the driving liquid crystal cell 3 and the polarizer 4 is the optical anisotropic element 7 identical with the optical anisotropic element 6, while the liquid crystal cell 5 for visual angle compensation is disposed between the optical anisotropic element 7 and the polarizer 4. The upper substrate (5.1), made from the aligned film identical with that of the liquid crystal cell 2 for visual angle compensation, of the liquid crystal cell 5 for visual angle compensation has been rubbed in the direction shown by the arrow. Vertical alignment has been made on the surface of the substrate on the side contacting with the liquid crystal cell of the liquid crystal cell 5 for visual angle compensation for the substrate on the side of the polarizer 4. The rubbing axis 4.1 runs parallel to the rubbing axis 3.1 of the upper substrate of the driving liquid crystal cell 3.

Figure 22:
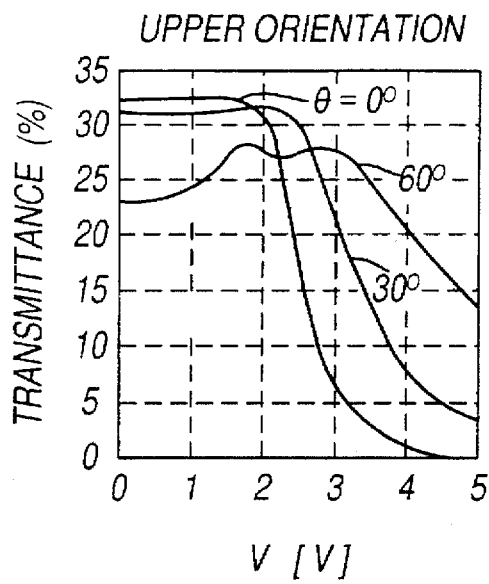
FIG. 22 is graphs showing the effects of embodiment 6.
Figure 22:
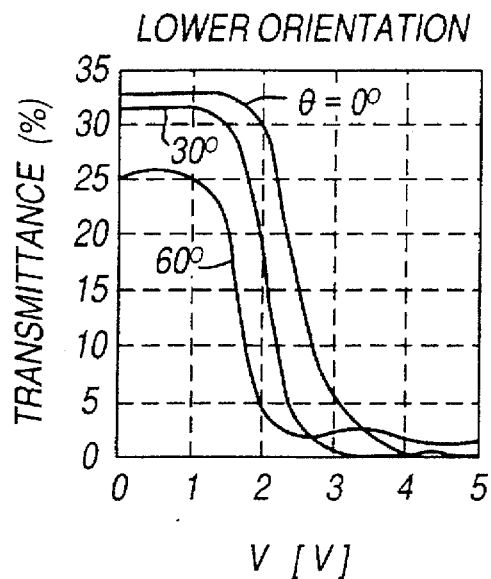
Figure 22:
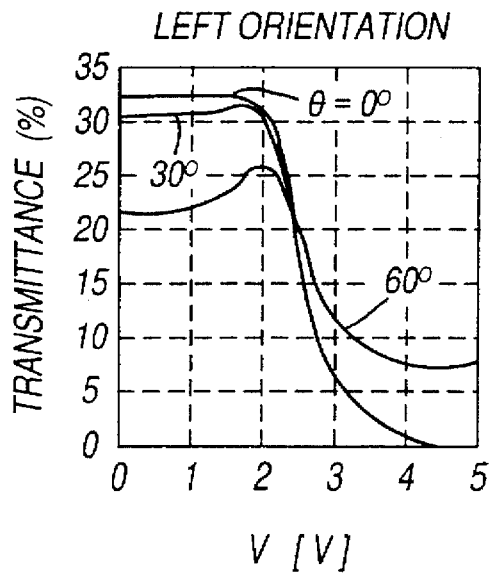
Figure 22:
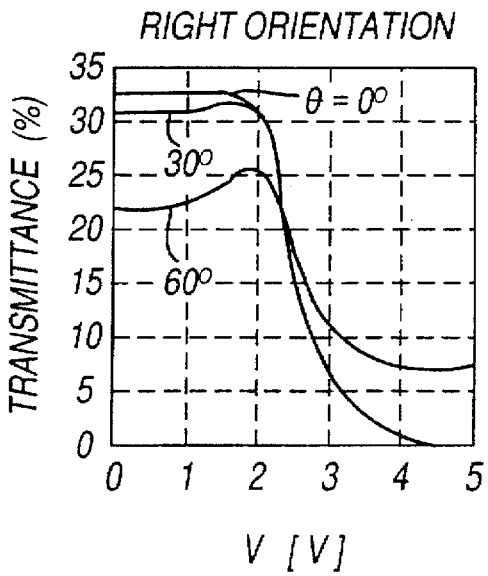

FIG. 22 manifests the electrooptic characteristics of the optical anisotropic element by this constitution measured according to the orientation as defined in the coordinate system as shown in FIG. 2b. As is clear from comparison with the characteristic diagram 12 which shows the characteristics in the prior art, the visual characteristic in this Embodiment were better than those in Embodiment 2 in all the orientations, upper and lower, right and left.

Embodiment 7

Manufacturing in Embodiment 2, a high molecular copolymer in which the polysiloxane principal chain includes the liquid crystal cells 2 and 5 for visual angle compensation and the side chains are a suitable proportion of biphenyl benzoate and cholesteryl group revealed the characteristics similar to those in Embodiment 6. Preparing an optical anisotropic element from high molecular copolymer allows to realize a thinner liquid crystal display device.

According to this invention, a high quality liquid crystal display device which is excellent in visibility with improved contrast and viewing angle characteristic in display color is provided.

Though this specification mentioned only TN-LCD with TFT, it is needless to say that excellent effects can be had if it is applied to such simple matrix liquid crystal display device as STN.

What is claimed is:

1. A liquid crystal display device having two polarizers and a driving liquid crystal cell arranged between the two polarizers, the driving liquid crystal cell having two substrates with electrodes and a liquid crystal layer having a twisted liquid crystal molecular alignment with no applied voltage between the substrates and performing optical control using an optical rotatory power of the liquid crystal layer, wherein an optical anisotropic element is disposed between at least one of the polarizers and the driving liquid crystal cell, the optical anisotropic element having an optical rotatory power in the direction slanted to the normal of a surface of the substrates which is greater than an optical rotatory power in the direction of the normal of the substrates.

2. The liquid crystal display device of claim 1, wherein an angle of the optical axis of optical anisotropic unit in the optical anisotropic element varies continuously or in stages in the direction of layer thickness of the optical anisotropic element as against the surface of the substrates of optical anisotropic element and the optical anisotropy in the optical anisotropic unit is positive.

3. The liquid crystal display device of claim 1, wherein an angle of the optical axis of the optical anisotropic unit in the surface of the optical anisotropic element is substantially parallel to the substrate surface of the driving liquid crystal cell and angles of optical axes in the element vary in the direction of layer thickness of the optical anisotropic element, the optical axes being substantially parallel to the normal of the substrate.

4. The liquid crystal display device of claim 1, wherein an angle of the optical axis of the optical anisotropic unit in the surface of the optical anisotropic element is substantially normal to the substrate surface of the driving liquid crystal cell and angles of optical axes in the element vary in the direction of layer thickness of the optical anisotropic element, the optical axes being substantially parallel to the surface of the substrate.

5. The liquid crystal display device of claim 1, wherein the alignment of the optical anisotropic unit in the optical anisotropic element is bend state.

6. The liquid crystal display device of claim 1, wherein the alignment of the optical anisotropic unit in the optical anisotropic element is splay state.

7. The liquid crystal display device of claim 1, wherein the respective optical axes in the optical anisotropic element, as viewed from the direction of the normal to the substrate of the driving liquid crystal cell, are aligned in one direction.

8. The liquid crystal display device of claim 1, wherein at least one of first optical anisotropic elements and at least one of second optical anisotropic elements are arranged respectively, wherein the first optical anisotropic element has layers and optical axis at the surface of the element is substantially normal to the substrate of the driving liquid crystal cell and the optical axes in the element vary toward one direction substantially parallel to the substrate surface, where the optical axes of the optical anisotropic element are aligned in one direction as viewed from the direction of the normal of the substrate of the driving liquid crystal cell, and the second optical anisotropic element has layers and optical axis at the surface of the element is substantially parallel to the substrate surface of driving liquid crystal cell and the optical axes in the element vary toward one direction substantially normal to the substrate, where the respective optical axes in the element are aligned in one direction as viewed from the direction of the normal of the substrate of the driving liquid crystal cell.

9. The liquid crystal display device of claim 1, wherein the optical axis of the optical anisotropic element as viewed from the direction of the normal of the substrate of the driving liquid crystal cell is aligned to be parallel or perpendicular the absorption axes of the polarizers.

10. The liquid crystal display device of claim 8, wherein between the polarizers and the optical anisotropic element, a second optical anisotropic element with optical anisotropy negative to the direction of the thickness is arranged.

11. The liquid crystal display device of claim 1, wherein the optical anisotropic element comprises polymer-liquid crystal.

12. A liquid crystal display device having two polarizers and a driving liquid crystal cell arranged between the polarizers, the driving liquid crystal cell having two substrates with electrodes and a liquid crystal layer interposed between the two substrates, which optically controls utilizing an optical rotatory power of the liquid crystal layer, the liquid crystal layer having a twisted alignment when no voltage is applied, wherein the driving liquid crystal cell has a first direction with greater optical rotatory power and a second direction with smaller optical rotatory power in the two directions symmetrically tilted from the normal of the substrate, and an optical anisotropic element is arranged between the polarizers and the driving liquid crystal cell has an optically rotatory power in tilted direction from the normal of the substrate is greater than that in the direction of the substrate, the optical anisotropic element having the first direction with smaller optical rotatory power and the second direction with greater optical rotatory power in the two directions symmetrically tilted from the normal of the substrate to compensate for the asymmetry of the optical rotatory power of the driving liquid crystal cell.

13. An optical anisotropic element with optical anisotropic substance layers, wherein an optical rotatory power of the optical anisotropic substance layers in the direction slanted to the normal of the surface of the optical anisotropic element is greater than that in the direction of the normal.

14. The optical anisotropic element of claim 13, wherein an angle of the optical axis of the optical anisotropic element varies continuously or in stages in the direction of the layer thickness of the optical anisotropic element as against the surface of this optical anisotropic element.

15. The optical anisotropic element of claim 13, wherein an angle of the optical axis of the optical anisotropic element is substantially parallel to a surface of the optical anisotropic element and varies in the layer of the optical anisotropic element so that it is substantially along the normal of the other surface of the optical anisotropic element.

16. The optical anisotropic element of claim 13, wherein an angle of the optical axis of the optical anisotropic element varies in the layer of the optical anisotropic element, the optical axis being substantially normal to a surface of the optical anisotropic element and being substantially parallel to the other surface of the optical anisotropic element.

17. The optical anisotropic element of claim 13, wherein the respective optical axes of the optical anisotropic element are aligned in one direction when viewed from the direction of the normal of the driving liquid crystal cell.

18. The optical anisotropic element of claim 13, wherein the element has two directions symmetrically tilted about the normal to the surface of the optical anisotropic element, the first direction having a greater optical rotatory power and the second direction having a smaller optical rotatory power.

* * * * *